US009457801B2

(12) United States Patent
Onouchi et al.

(10) Patent No.: US 9,457,801 B2
(45) Date of Patent: Oct. 4, 2016

(54) CONTROL DEVICE FOR HYBRID VEHICLE

(71) Applicant: AISIN AW CO., LTD., Anjo-shi, Aichi-ken (JP)

(72) Inventors: Tomohiro Onouchi, Anjo (JP); Kohei Tsuda, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 85 days.

(21) Appl. No.: 14/417,720

(22) PCT Filed: Sep. 27, 2013

(86) PCT No.: PCT/JP2013/076409
§ 371 (c)(1),
(2) Date: Jan. 27, 2015

(87) PCT Pub. No.: WO2014/051107
PCT Pub. Date: Apr. 3, 2014

(65) Prior Publication Data
US 2015/0298690 A1    Oct. 22, 2015

(30) Foreign Application Priority Data

Sep. 28, 2012  (JP) ................................. 2012-218393
Mar. 28, 2013  (JP) ................................. 2013-070487

(51) Int. Cl.
*B60L 9/00*     (2006.01)
*B60W 20/00*    (2016.01)
(Continued)

(52) U.S. Cl.
CPC ............... *B60W 20/40* (2013.01); *B60K 6/38* (2013.01); *B60K 6/40* (2013.01); *B60K 6/48* (2013.01);
(Continued)

(58) Field of Classification Search
CPC .... B60W 20/40; B60W 20/13; B60W 10/02; B60W 10/04; B60W 10/06; B60W 10/08; B60W 20/00; B60W 30/18027; B60W 2540/00; B60W 2710/021; B60W 2710/025; B60W 2710/0644; B60W 2710/081; B60K 6/38; B60K 6/40; B60K 6/48; B60K 6/547; F02D 29/06; Y01S 903/93
USPC .......... 701/22, 60, 113; 903/902; 180/65.22, 180/65.25; 477/5, 77
See application file for complete search history.

(56) References Cited

U.S. PATENT DOCUMENTS 8,498,765 B2 *  7/2013 Tajima ..................... B60K 6/48
                                                    180/65.1
2002/0050259 A1 * 5/2002 Kojima .................. B60K 6/365
                                                    123/179.3
(Continued)

FOREIGN PATENT DOCUMENTS

JP    2007-314097 A    12/2007
JP    2010-100180 A     5/2010
(Continued)

OTHER PUBLICATIONS

Jan. 7, 2014 International Search Report issued in International Patent Application No. PCT/JP2013/076409.

*Primary Examiner* — Shardul Patel
(74) *Attorney, Agent, or Firm* — Oliff PLC

(57) ABSTRACT

A control device for a hybrid vehicle for use in a hybrid vehicle in which a first clutch, a rotary electric machine, and a second clutch are disposed on a power transfer path from an engine to wheels sequentially from the engine side. After power generation control in which the engine is driven with the first clutch directly engaged and with the second clutch disengaged is suspended on the basis of detection of the starting request from a state in which the vehicle is stationary with the power generation control performed, the second clutch control means controls the second clutch from a disengaged state to a slip engagement state, the first clutch control means controls the first clutch from an engaged state to a slip engagement state, and the rotary electric machine control means reduces the target revolving speed.

18 Claims, 9 Drawing Sheets

(51) Int. Cl.

| | |
|---|---|
| *B60K 6/48* | (2007.10) |
| *B60K 6/547* | (2007.10) |
| *B60W 10/02* | (2006.01) |
| *F02D 29/06* | (2006.01) |
| *B60W 30/18* | (2012.01) |
| *B60K 6/38* | (2007.10) |
| *B60K 6/40* | (2007.10) |
| *B60W 10/04* | (2006.01) |
| *B60W 10/06* | (2006.01) |
| *B60W 10/08* | (2006.01) |

(52) U.S. Cl.
CPC .............. *B60K 6/547* (2013.01); *B60W 10/02* (2013.01); *B60W 10/04* (2013.01); *B60W 10/06* (2013.01); *B60W 10/08* (2013.01); *B60W 20/00* (2013.01); *B60W 20/13* (2016.01); *B60W 30/18027* (2013.01); *B60W 30/18054* (2013.01); *F02D 29/06* (2013.01); *B60K 2006/4825* (2013.01); *B60W 2540/00* (2013.01); *B60W 2710/021* (2013.01); *B60W 2710/025* (2013.01); *B60W 2710/0644* (2013.01); *B60W 2710/081* (2013.01); *B60Y 2300/429* (2013.01); *Y02T 10/6221* (2013.01); *Y02T 10/6252* (2013.01); *Y10S 903/93* (2013.01)

(56) References Cited

U.S. PATENT DOCUMENTS

| | | | | |
|---|---|---|---|---|
| 2004/0038776 | A1* | 2/2004 | Kuhstrebe | B60K 6/485 477/77 |
| 2007/0272456 | A1* | 11/2007 | Shiiba | B60K 6/48 180/65.275 |
| 2007/0275819 | A1* | 11/2007 | Hirata | B60K 6/365 477/5 |
| 2012/0078457 | A1 | 3/2012 | Tajima et al. | |
| 2012/0271498 | A1* | 10/2012 | Kobayashi | B60W 10/06 701/22 |
| 2013/0012353 | A1* | 1/2013 | Yoshida | B60K 6/48 477/5 |
| 2013/0138282 | A1* | 5/2013 | Shin | B60W 20/106 701/22 |
| 2015/0329105 | A1* | 11/2015 | Matsui | B60K 6/48 701/22 |

FOREIGN PATENT DOCUMENTS

| | | |
|---|---|---|
| JP | 2010-143306 A | 7/2010 |
| JP | 2011-020507 A | 2/2011 |
| JP | 2012-091776 A | 5/2012 |
| JP | 2012091776 A * | 5/2012 |
| JP | 2013-112335 A | 6/2013 |
| WO | 2011/125775 A1 | 10/2011 |
| WO | 2012/043555 A1 | 4/2012 |

* cited by examiner

CONTROL DEVICE FOR HYBRID VEHICLE

Attached are a marked-up copy of the originally filed specification and a clean substitute specification in accordance with 37 C.F.R. §§1.121(b)(3) and 1.125(c). The substitute specification contains no new matter.

TECHNICAL FIELD

Preferred embodiments relate to a control device for a hybrid vehicle in which a first clutch, a rotary electric machine, and a second clutch are disposed on a power transfer path from an engine to wheels sequentially from the engine side, and specifically relates to a control device for a hybrid vehicle that suspends power generation control and starts the vehicle when a starting request is detected during power generation control in which the rotary electric machine is driven by the engine.

BACKGROUND ART

In recent years, there has been developed a hybrid vehicle of a so-called one-motor parallel type that includes an engine, a motor/generator (hereinafter referred to simply as "motor"), an engine connection clutch interposed between the engine and the motor, and a speed change mechanism that has a clutch capable of enabling and disabling power transfer between the engine and the motor and wheels (see Patent Document 1 and Patent Document 2, for example).

In the hybrid vehicle of a one-motor parallel type discussed above, when the battery remaining capacity becomes low while the vehicle is stationary, power generation is performed by engaging the engine connection clutch and rotationally driving the motor by use of the engine with power transfer disabled by the clutch of the speed change mechanism.

In the hybrid vehicle according to Patent Document 1, in the case where a starting request for the vehicle, which is made by a driver through an operation, such as turning off a brake or turning on an accelerator, is detected during power generation performed while the vehicle is stationary, the vehicle can be started responsively using a drive force of the motor by disengaging the engine connection clutch and causing the clutch of the speed change mechanism to slip, for example, that is, through EV travel.

In the starting method according to Patent Document 1, however, the vehicle cannot be started through EV travel in the case where the battery remaining capacity is low. In the case where the vehicle cannot be started through EV travel, the vehicle is started using a drive force of the engine by temporarily disengaging the engine connection clutch, engaging the clutch of the speed change mechanism, and thereafter further subjecting the engine connection clutch to slip engagement. Thus, it takes much time since the driver makes a starting request (such as turning off a brake or turning off an accelerator) until the vehicle actually starts, which provides the driver with a feeling such as hesitation.

In the hybrid vehicle according to Patent Document 2, meanwhile, in the case where a starting request for the vehicle that is made by a driver through an operation, such as turning off a brake or turning on an accelerator, is detected during power generation performed while the vehicle is stationary, the vehicle can be started responsively using a drive force of the engine by bringing the engine connection clutch into a slip engagement state and causing the clutch of the speed change mechanism to slip, for example, that is, using a drive force of the engine.

RELATED-ART DOCUMENTS

Patent Documents

[Patent Document 1] Japanese Patent Application Publication No. 2007-314097 (JP 2007-314097 A)
[Patent Document 2] International Patent Application Publication No. 2011/125775 (WO2011/125775)

SUMMARY

Problem to be Solved

In the hybrid vehicle according to Patent Document 2, however, the vehicle is started while power generation control is being executed in order to maintain electric power supply to accessories (such as a headlamp and an air conditioner), for example. Therefore, it is necessary to maintain the revolving speed of the motor at a speed that enables power generation although the revolving speed of the motor is reduced since the starting request is detected. When the vehicle is started with the clutch of the speed change mechanism brought into a slip engagement state, a load is imposed on the clutch of the speed change mechanism, which is not preferable for the durability of the clutch.

Thus, it is an object of preferred embodiments to provide a control device for a hybrid vehicle that causes the hybrid vehicle to start on the basis of detection of a starting request from a state in which power generation control is performed during a vehicle stationary state, and that is capable of improving response from the starting request to start of the vehicle and lessening hesitation as well as securing the durability of the second clutch.

Means for Solving the Problem

Preferred embodiments (see FIGS. 1 to 9, for example) provides a control device for a hybrid vehicle for use in a hybrid vehicle in which a first clutch (SSC), a rotary electric machine, and a second clutch are disposed on a power transfer path from an engine to wheels sequentially from the engine side, the control device being configured to start the hybrid vehicle on the basis of detection of a starting request, characterized by including:

first clutch control means for controlling an engagement state of the first clutch (SSC) on the basis of detection of the starting request;

second clutch control means for controlling an engagement state of the second clutch on the basis of detection of the starting request; and rotary electric machine control means for performing revolving speed control for the rotary electric machine such that a revolving speed of the rotary electric machine reaches a target revolving speed (Nmtg) on the basis of detection of the starting request, in which after power generation control in which the engine is driven with the first clutch (SSC) directly engaged and with the second clutch disengaged is suspended on the basis of detection of the starting request from a state in which the vehicle is stationary with the power generation control performed, the second clutch control means controls the second clutch from a disengaged state to a slip engagement state, the first clutch control means controls the first clutch from an engaged state to a slip engagement state, and the rotary electric machine control means reduces the target revolving speed.

Consequently, the second clutch can be controlled from the disengaged state to the slip engagement state and the first clutch can be controlled from the engaged state to the slip engagement state with the power generation control suspended and the revolving speed of the rotary electric machine reduced when the hybrid vehicle starts. Thus, it is possible to prevent imposition of a load on the second clutch, and to improve the durability of the second clutch. Moreover, the revolving speed of the rotary electric machine is reduced with the power generation control suspended. Thus, it is no longer necessary to adjust the revolving speed of the rotary electric machine through slip of the second clutch of the speed change mechanism, which improves response for there being no need for revolving speed adjustment. Furthermore, since the second clutch is controlled from the disengaged state to the slip engagement state and the first clutch is controlled from the engaged state to the slip engagement state on the basis of the detection of the starting request, the vehicle can be started responsively, which lessens hesitation.

In preferred embodiments (see FIGS. 1 to 9, for example), the hybrid vehicle has an alternator capable of generating power through rotation of the engine to supply electric power to an accessory; and
the rotary electric machine control means reduces the target revolving speed while the alternator is generating power with the engine driven on the basis of detection of the starting request.

Consequently, power generation is performed by the alternator when the vehicle starts. Thus, it is possible to suspend power generation by the rotary electric machine, that is, to reduce the target revolving speed for the rotary electric machine.

In preferred embodiments (see FIGS. 1 to 9, for example), when reducing the target revolving speed, the rotary electric machine control means (23) reduces the target revolving speed (Nmtg) with a first predetermined gradient, and thereafter reduces the target revolving speed with a second predetermined gradient that is gentler than the first predetermined gradient.

Consequently, the revolving speed of the rotary electric machine can be reduced with the first predetermined gradient which is a steep gradient. Thus, it is possible to further reduce the load on the second clutch to be brought into the slip engagement state. Moreover, if the revolving speed of the rotary electric machine is synchronized with the revolving speed of the second clutch on the output side, for example, the engagement state of the second clutch may not be detected. By reducing the revolving speed of the rotary electric machine with the second predetermined gradient which is a gentle gradient, however, it is possible to avoid imposition of a load on the second clutch, and to secure the controllability of the slip engagement state of the second clutch.

In preferred embodiments (see FIGS. 1 to 9, for example), the second clutch control means causes the second clutch to transition to a direct engagement state when the revolving speed (Nm) of the rotary electric machine falls within a predetermined revolving speed difference with respect to a revolving speed (Ns) obtained by multiplying a speed ratio of the speed change mechanism and an output revolving speed (Nout).

The rotary electric machine control means executes the revolving speed control such that the rotational speed of the rotary electric machine is lowered with the set gradient since the slip engagement of the first clutch is determined until the rotational speed of the rotary electric machine falls within the predetermined rotational speed with respect to the rotational speed obtained by multiplying the speed ratio of the speed change mechanism and the output rotational speed. Thus, synchronization in rotation can be achieved between the rotary electric machine and the wheels responsively, which lessens hesitation and enables smooth starting.

Preferred embodiments (see FIGS. 1 to 9, for example) further includes:
required drive force calculation means for calculating a required drive force (Treq) required by a driver, and
the second clutch control means controls the second clutch such that the second clutch generates a torque capacity for transfer of the required drive force (Treq) during execution of the revolving speed control for the rotary electric machine.

Consequently, even if a drive force that is equal to or more than the required drive force required by the driver is output from the rotary electric machine which is subjected to the revolving speed control, the output drive force of the vehicle can be caused to match the required drive force required by the driver until synchronization in rotational speed is achieved between the rotary electric machine and the wheels.

In preferred embodiments (see FIGS. 1 to 9, for example), the rotary electric machine control means executes the revolving speed control so that a predetermined revolving speed (for example, Ni+d1) that is different from the revolving speed of the engine is achieved until the slip engagement state of the first clutch (SSC) is determined.

Consequently, slip of the first clutch can be promoted by providing different revolving speeds to the input side and the output side of the first clutch. Moreover, the revolving speeds of the engine and the rotary electric machine are different from each other when the first clutch slips. Thus, slip of the first clutch can be detected easily.

In preferred embodiments (see FIGS. 1 to 9, for example), the rotary electric machine control means determines the slip engagement state of the first clutch on the basis of a revolving speed difference between the revolving speed (Nm) of the rotary electric machine, which is detected by a rotary electric machine revolving speed sensor, and the revolving speed of the engine (2), which is detected by an engine revolving speed sensor.

Consequently, the rotary electric machine control means can determine slip of the first clutch on the basis of a revolving speed difference between the revolving speed of the rotary electric machine, which is detected by the rotary electric machine revolving speed sensor, and the revolving speed of the engine, which is detected by the engine revolving speed sensor.

In preferred embodiments (see FIGS. 1 to 9, for example), the rotary electric machine control means finishes the revolving speed control and starts torque control in which the rotary electric machine is controlled such that output torque of the rotary electric machine reaches target torque when the revolving speed (Nm) of the rotary electric machine falls within a predetermined revolving speed difference with respect to a revolving speed (Ns) obtained by multiplying the speed ratio of the speed change mechanism and the output revolving speed (Nout).

Consequently, the rotary electric machine can be returned to the normal torque control when the second clutch is brought into the direct engagement state, which enables the vehicle to accelerate without a discomfort.

In preferred embodiments (see FIGS. 1, 8, and 9, for example), the rotary electric machine control means sets the target torque to a value (Tmfb-A) obtained by subtracting torque required to vary the revolving speed of the rotary electric machine from the output torque of the rotary electric machine at a time when the revolving speed control is finished for a first predetermined time (TB) since the torque control is started.

Consequently, torque output from the rotary electric machine during the rotational speed control has a value obtained by adding torque required to vary the revolving speed of the rotary electric machine to a value obtained by subtracting the torque capacity transferred through the second clutch from the torque capacity transferred through the first clutch. Thus, by setting the target torque to a value obtained by subtracting torque required to vary the revolving speed of the rotary electric machine from the output torque of the rotary electric machine at the time when the revolving speed control is finished for the first predetermined time since the torque control is started, the rotary electric machine control means can set the target torque for the rotary electric machine to a value obtained by subtracting the torque capacity transferred through the second clutch from the torque capacity transferred through the first clutch for the first predetermined time since the torque control is started. That is, torque obtained by subtracting the target torque for the rotary electric machine from the torque capacity transferred through the first clutch is transferred to the second clutch which has just started being engaged, so that the second clutch will not slip. When the first predetermined time elapses, engagement of the second clutch progresses, and the torque capacity of the second clutch becomes sufficiently large. Thus, the second clutch will not slip thereafter.

Preferred embodiments (see FIGS. 1 and 5 to 7, for example) further includes:

timer means for counting a time elapsed since the power generation control is suspended; and forced slip means for executing forced slip control in which the first clutch (SSC) is forcibly caused to slip in the case where a revolving speed difference between the revolving speed (Nm) of the rotary electric machine, which is detected by a rotary electric machine revolving speed sensor, and the revolving speed (Ne) of the engine, which is detected by an engine revolving speed sensor, is not detected even when the time counted by the timer means reaches a second predetermined time (TA).

Consequently, it is possible to increase certainty of transition to slip of the first clutch after the power generation control is suspended.

In preferred embodiments (see FIGS. 1 and 5 to 7, for example), the forced slip means executes the forced slip control by providing a command to the rotary electric machine control means to control the revolving speed (Nm) of the rotary electric machine to a revolving speed (for example, Ni−d3) that is lower than the revolving speed (Ne) of the engine.

Consequently, the forced slip means can execute the forced slip control by providing a command to the rotary electric machine control means to control the revolving speed of the rotary electric machine to a revolving speed that is lower than the revolving speed of the engine.

Preferred embodiments (see FIGS. 1 and 5 to 7, for example) further includes:

engine control means for controlling the revolving speed (Ne) of the engine, and the forced slip means executes the forced slip control by providing a command to the engine control means to control the revolving speed (Ne) of the engine to a revolving speed (for example, Ni+d1+d4) that is higher than the revolving speed (Nm) of the rotary electric machine.

Consequently, the forced slip means can execute the forced slip control by providing a command to the engine control means to control the revolving speed of the engine to a revolving speed that is higher than the revolving speed of the rotary electric machine.

In preferred embodiments (see FIGS. 1 to 7, for example), the rotary electric machine control means executes the revolving speed control such that the target revolving speed (Nmtg) is reduced with a larger gradient as an accelerator operation amount before start of slip of the first clutch (SSC) is larger.

Consequently, the vehicle can be started responsively in accordance with a request for starting acceleration from the driver.

The symbols in the above parentheses are provided for reference to the drawings. Such symbols are provided for convenience to facilitate understanding of the preferred embodiments, and should not be construed as affecting the scope of the claims in any way.

MODES FOR CARRYING OUT THE INVENTION

<First Embodiment>

Figure 1:
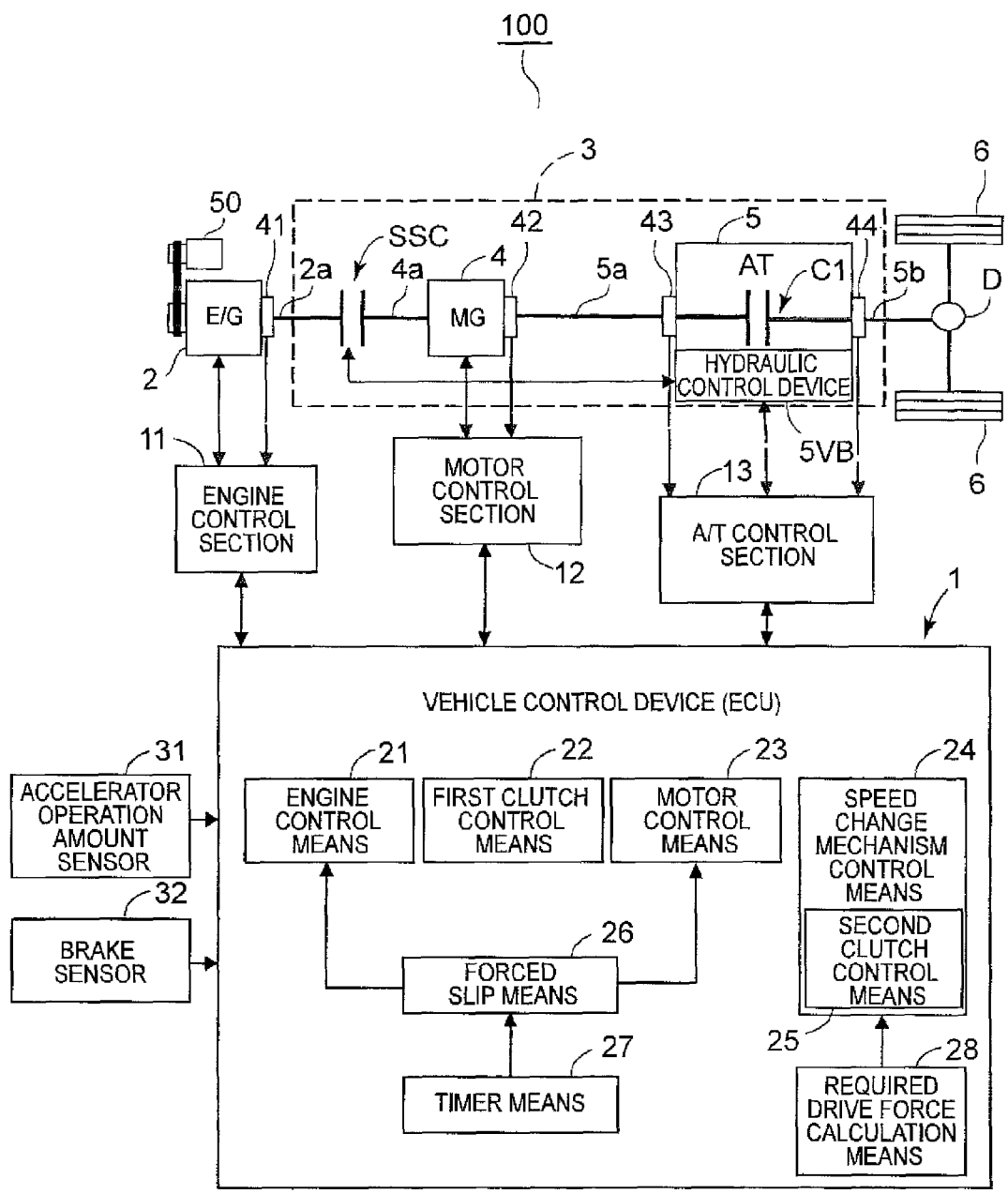
FIG. 1 is a block diagram illustrating a hybrid vehicle and a control device for the hybrid vehicle.

A first embodiment will be described below with reference to FIGS. 1 to 4. Forced slip means 26 and timer means 27 in FIG. 1 are provided for a second embodiment, and will not be described in relation to the first embodiment. Herein, the terms "rotational speed" and "revolving speed" are used as synonyms.

As illustrated in FIG. 1, a hybrid vehicle 100 includes, as its drive system, an engine 2 and a hybrid drive device 3 connected to an output shaft (crankshaft) 2a of the engine 2. An output shaft 5b of the hybrid drive device 3 is drivably coupled to a differential device D via a propeller shaft or the like. A drive force is transferred from the differential device D to left and right wheels 6 via left and right drive shafts or the like. In the hybrid vehicle 100, in addition, an alternator 50 capable of generating power through rotation of the engine 2 to supply electric power to an accessory (such as lamps and an air conditioner) is disposed to be drivably coupled to the engine 2.

The engine 2 is electrically connected to an engine control section 11 that freely controls an engine rotational speed (engine revolving speed) Ne and engine torque Te on the basis of a command from engine control means 21 of a vehicle control device (ECU) 1 to be discussed in detail later. In addition, an engine rotational speed sensor (engine revolving speed sensor) 41 that detects the rotational speed of the output shaft 2a of the engine 2, that is, the engine rotational speed Ne, is disposed on the outer peripheral side of the output shaft 2a.

The hybrid drive device 3 is disposed on the power transfer path from the engine 2 to the wheels 6, and roughly includes a first clutch SSC for engine connection, a motor/generator (rotary electric machine) 4, and a speed change mechanism 5 disposed sequentially from the engine 2 side. The first clutch SSC is interposed between the output shaft 2a of the engine 2 and a rotor shaft 4a of the motor/generator (hereinafter referred to simply as "motor") 4, and can frictionally engage the output shaft 2a and the rotor shaft 4a with each other. That is, the engagement state of the first clutch SSC is freely controlled in accordance with a first clutch hydraulic pressure $P_{SSC}$ supplied from a hydraulic control device 5VB that receives an electric command from an AT control section 13 on the basis of a command from first clutch control means 22 of the vehicle control device (ECU) 1 to be discussed in detail later. The torque capacity of the first clutch SSC is also freely controlled.

The motor 4 includes a stator and a rotor (not illustrated). The rotor shaft 4a to which the rotor is connected is drivably coupled to the output side of the first clutch SSC. The motor 4 is electrically connected to a motor control section 12 that freely controls a motor rotational speed (motor revolving speed) Nm and motor torque Tm (torque output from the motor 4) on the basis of a command from motor control means (rotary electric machine control means) 23 of the vehicle control device (ECU) 1 to be discussed in detail later. In addition, a motor rotational speed sensor (rotary electric machine revolving speed sensor) 42 that detects the rotational speed of the rotor shaft 4a of the motor 4, that is, the motor rotational speed Nm, is disposed on the outer peripheral side of the rotor shaft 4a. The rotor shaft 4a is directly drivably coupled to an input shaft 5a of the speed change mechanism 5 to be discussed later.

The speed change mechanism 5 is a stepped transmission that has a gear mechanism composed of an assembly of a plurality of planetary gear trains, for example, and is configured to change the speed ratio by changing the transfer path by changing the friction engagement state of a plurality of friction engagement elements (clutches and brakes) on the basis of a hydraulic pressure supplied from the hydraulic control device 5VB. A second clutch C1 is provided as one of the plurality of friction engagement elements. The second clutch C1 is configured to freely enable and disable power transfer between the input shaft 5a and the output shaft 5b, and can be frictionally engaged into a disengaged state, a slip engagement state, and a completely engaged state.

That is, the engagement state of the second clutch C1 is freely controlled in accordance with a second clutch hydraulic pressure $P_{C1}$ supplied from the hydraulic control device 5VB which receives an electric command from the AT control section 13 on the basis of a command from second clutch control means 25 of speed change mechanism control means 24 of the vehicle control device (ECU) 1 to be discussed in detail later. The torque capacity of the second clutch C1 is also freely controlled.

An input rotational speed sensor 43 that detects the rotational speed of the input shaft 5a of the speed change mechanism 5, that is, the input rotational speed (which is the same as the motor rotational speed Nm in the embodiment), is disposed on the outer peripheral side of the input shaft 5a. Further, an output rotational speed sensor 44 that detects the rotational speed of the output shaft 5b of the speed change mechanism 5, that is, an output rotational speed (output revolving speed) Nout, is disposed on the outer peripheral side of the output shaft 5b. The output shaft 5b is drivably coupled to the wheels 6 via the differential device D etc. as discussed above. Thus, the output rotational speed sensor 44 can also be used to detect a vehicle speed V.

In the embodiment, the second clutch C1 is engaged together with a one-way clutch (not illustrated), for example, to establish a first forward speed. That is, the second clutch C1 alone is engaged to establish the first forward speed of the speed change mechanism 5. However, the second clutch C1 may be engaged together with another friction engagement element at the same time, for example, to establish a shift speed that enables the vehicle to start such as first through third forward speeds.

Although in the embodiment, the speed change mechanism 5 is described as a stepped transmission, the speed change mechanism 5 may be a continuously variable transmission of a belt type, a toroidal type, a cone-ring type, or the like. In such a case, the second clutch C1 may be considered as a clutch that is built in the continuously variable transmission and that enables and disables power transfer.

The first clutch SSC and the second clutch C1 discussed above are each a frictionally engageable element with a transferable torque capacity that can be varied in accordance with the magnitude of a hydraulic pressure that presses two or more friction engagement members. Normally, the first clutch SSC and the second clutch C1 are each composed of a piston that presses the friction engagement members, a hydraulic cylinder that presses the piston, and a return spring that acts in the direction opposite to the hydraulic cylinder. The first clutch SSC and the second clutch C1, however, should not be limited thereto, and may be structured with a piston driven by a pressure difference caused by opposing cylinders, or may be structured with an arm or the like that is moved by a hydraulic actuator to press the friction engagement members.

The state of the first clutch SSC and the second clutch C1 is controlled in accordance with the magnitude of the hydraulic pressure as discussed above, and divided into the "disengaged state" in which the friction engagement members are separated from each other, the "slip engagement state" in which the clutch generates a torque capacity to be transferred with the friction engagement members slipping, and the "direct engagement state" in which the friction engagement members are fastened to each other with the hydraulic pressure increased to the maximum. The "slip engagement state" can be defined as a state since the piston travels from the disengaged state to reach a stroke end at which the piston contacts the friction engagement members until the revolving speeds of the friction engagement members are synchronized with each other. The "disengaged state" can be defined as a state in which the piston falls short of the stroke end to be separated from the friction engagement members.

Next, the vehicle control device (ECU) 1 which serves as a control device for the hybrid vehicle 100 will be described. As illustrated in FIG. 1, the vehicle control device 1 includes the engine control means 21, the first clutch control means 22, the motor control means 23, the speed change mechanism control means 24 which has the second clutch control means 25, and required drive force calculation means 28. In addition, an accelerator operation amount sensor 31 that detect the accelerator operation amount and a brake sensor 32 that detects the depressed state of a brake pedal are provided in the hybrid vehicle 100, and electrically connected to the vehicle control device 1.

The engine control means 21 provides a command to the engine 2 via the engine control section 11 to freely control the engine rotational speed Ne and the engine torque. The first clutch control means 22 provides a command to the hydraulic control device 5VB via the AT control section 13 to freely control the friction engagement state of the first clutch SSC by performing pressure regulation control on the first clutch hydraulic pressure $P_{SSC}$. The motor control means 23 provides a command to the motor 4 via the motor control section 12 (and an inverter circuit (not illustrated)) to freely control the motor rotational speed Nm through rotational speed control (revolving speed control) and the motor torque Tm through torque control.

In the rotational speed control, a motor target rotational speed Nmtg is calculated and set, and the motor rotational speed Nm detected by the motor rotational speed sensor 42 is electrically controlled by the inverter circuit or the like so as to reach the motor target rotational speed Nmtg. In the torque control, meanwhile, motor target torque is calculated and set, and the motor torque Tm is electrically controlled by the inverter circuit or the like so as to reach the motor target torque.

The speed change mechanism control means 24 selects and determines a shift speed on the basis of the vehicle speed and the accelerator operation amount, for example, provides a command to the hydraulic control device 5VB via the AT control section 13, and hydraulically controls the friction engagement elements (clutches and brakes) to perform speed change control (change the speed ratio). In addition, the second clutch control means 25 provides a command to the hydraulic control device 5VB via the AT control section 13 in the same manner as discussed above to freely control the engagement state (such as disengaged, slip engagement, and completely engaged states) of the second clutch C1, which is one of the plurality of friction engagement elements, by performing pressure regulation control on the second clutch hydraulic pressure $P_{C1}$.

The required drive force calculation means 28 calculates a required drive force required (intended) by a driver on the basis of the accelerator operation amount (whether the accelerator is turned on or off) detected by the accelerator operation amount sensor 31 and the depression state of the brake (whether the brake is turned on or off) detected by the brake sensor 32.

Figure 2:
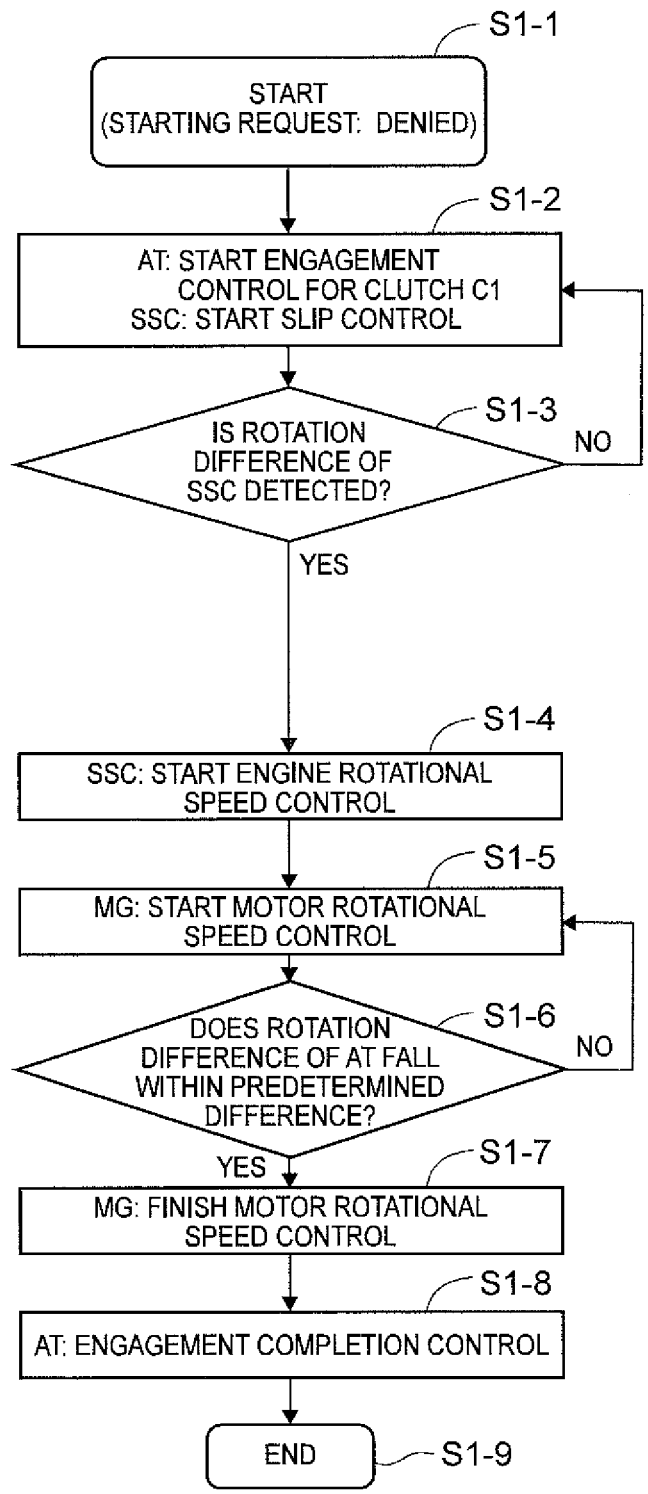
FIG. 2 is a flowchart illustrating control since suspension of power generation control until starting according to a first embodiment.

Subsequently, control performed by the vehicle control device 1 when starting the vehicle from a state in which the vehicle is stationary and power generation control is performed will be described with reference to FIGS. 2 to 4. In the following description, a case where the brake is turned off when the vehicle starts with creep travel will first be described with reference to FIGS. 2 and 3, and a case where the brake is turned off and thereafter the accelerator is turned on (depressed) when the vehicle starts will next be described with reference to FIG. 4 mainly with focus on differences from FIG. 3. The values of the clutch SSC hydraulic pressure $P_{SSC}$ and the clutch C1 hydraulic pressure $P_{C1}$ indicated in FIGS. 3 and 4 are command values provided from the vehicle control device 1 to the hydraulic control device 5VB, and the actual hydraulic pressures gradually follow the command values with a predetermined response speed.

Figure 3:
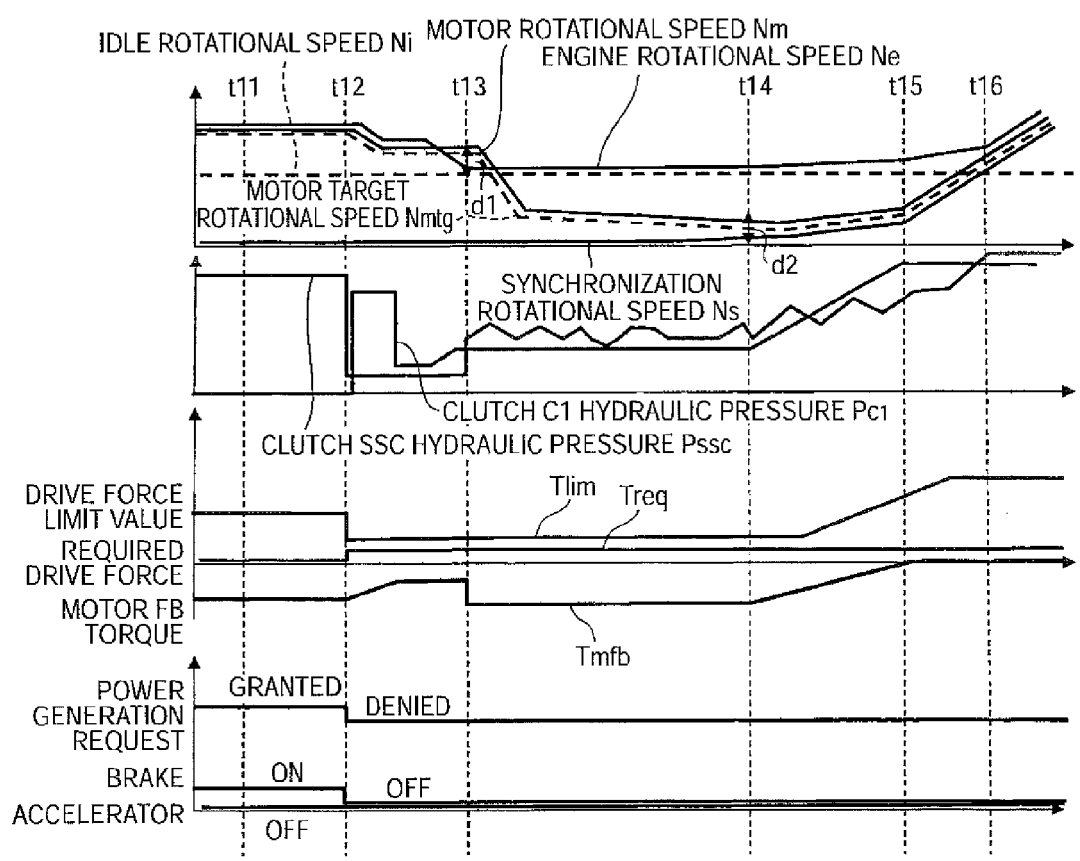
FIG. 3 is a time chart illustrating starting with the accelerator operation amount turned off according to the first embodiment.
Figure 4:
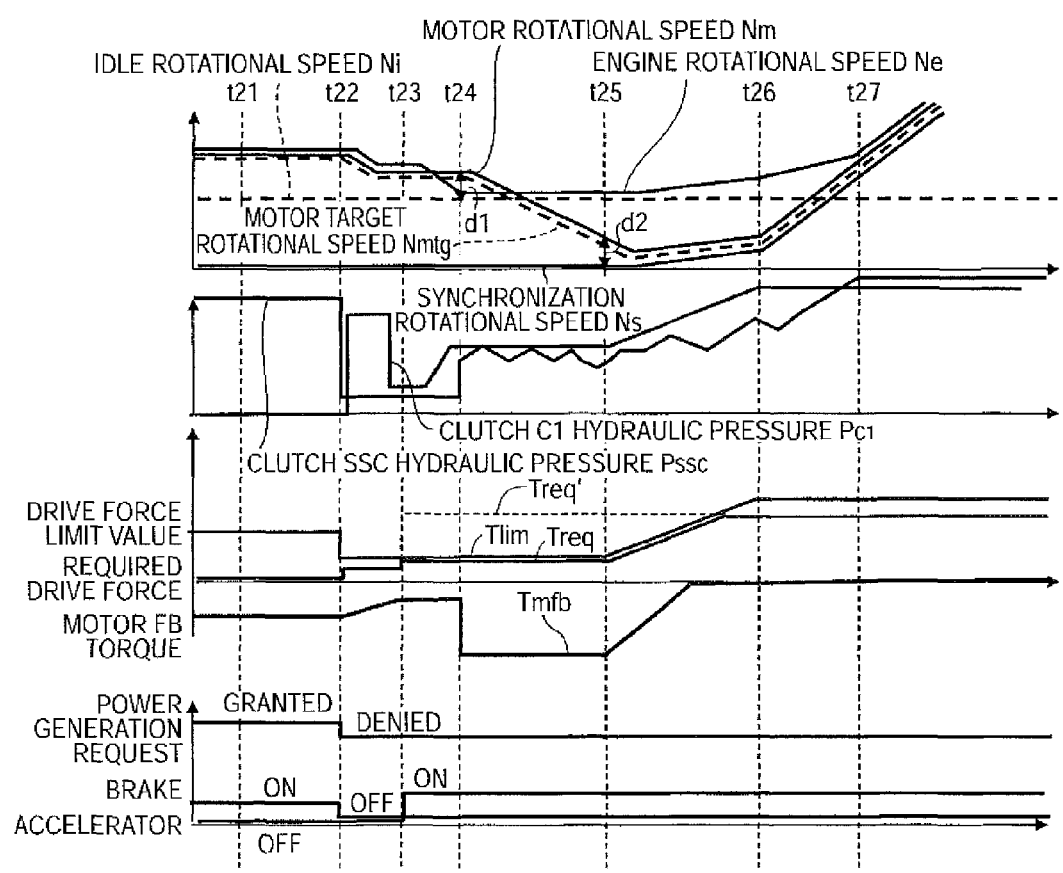
FIG. 4 is a time chart illustrating starting with the accelerator operation amount turned on according to the first embodiment.

As illustrated in FIG. 3, in a state in which the vehicle control device 1 determines power generation control (power generation request is granted) on the basis of an insufficient remaining capacity of a battery (not illustrated) in order to charge the battery during a vehicle stationary state in which the driver depresses the brake to turn on the brake, for example, and the hybrid vehicle 100 is stationary in a neutral range (N range), for example, the clutch SSC hydraulic pressure $P_{SSC}$ as a complete engagement command is supplied from the hydraulic control device 5VB to the first clutch SSC on the basis of a command from the first clutch control means 22 to bring the first clutch SSC into the direct engagement state, which drivably couples the engine 2 and the motor 4 to each other. No supply (0 pressure) of the clutch C1 hydraulic pressure $P_{C1}$ from the hydraulic control device 5VB to the second clutch C1 is commanded on the basis of a command from the second clutch control means 25 to bring the second clutch C1 into the disengaged state, which disables power transfer between the engine 2 and the motor 4 and the wheels 6. The engine 2 is then controlled to a rotational speed for power generation on the basis of a command from the engine control means 21. That is, the motor 4 is driven by the engine 2 to generate power for the battery.

When the driver performs an N-D operation from the neutral range to a drive range (D range) from this state at time t11 and releases the brake to turn off the brake at time t12, for example, the vehicle control device 1 determines (detects) that the driver is requesting starting (starting request), and the vehicle control device 1 determines suspension of the power generation control by the motor 4 (power generation request is denied). As illustrated in FIG. 2, starting control is started (S1-1) after the power generation control is suspended (power generation request is denied). First, as illustrated in FIG. 3, the first clutch control means 22 lowers the clutch SSC hydraulic pressure $P_{SSC}$ to a predetermined pressure such that the first clutch SSC is brought into the slip engagement state, and the second clutch control means 25 starts engagement control for the second clutch C1 (S1-2). The predetermined pressure for the clutch SSC hydraulic pressure $P_{SSC}$ is a command value that causes the first clutch SSC to be disengaged when a long time elapses. In consideration of the hydraulic response, however, the first clutch SSC is in the slip engagement state, and not completely disengaged. Although the power generation control by the motor 4 is suspended, power generation for accessories is performed by the alternator 50 since the engine 2 is rotating.

First, the second clutch control means 25 provides a command for fast fill of the clutch C1 hydraulic pressure $P_{C1}$ (play elimination up to the stroke end) on the basis of the detection of the starting request (on the basis of the suspension of the power generation control). Meanwhile, the required drive force calculation means 28 calculates a required drive force Treq as an amount corresponding to creep torque on the basis of the accelerator operation amount detected by the accelerator operation amount sensor 31 being off (0%). When the fast fill is finished, the second clutch control means 25 provides a command for the clutch C1 hydraulic pressure $P_{C1}$ such that the second clutch C1 transfers the required drive force Treq. In order to protect the speed change mechanism 5, the speed change mechanism control means 24 sets a drive force limit value Tlim, and provides a command for the clutch C1 hydraulic pressure $P_{C1}$ such that the second clutch C1 transfers the drive force limit value Tlim if the required drive force Treq exceeds the drive force limit value Tlim.

Meanwhile, the engine control means 21 provides a command to the engine 2 to control the engine rotational speed Ne to an idle rotational speed Ni on the basis of the detection of the starting request (on the basis of the suspension of the power generation control). The motor control means 23 sets the motor target rotational speed Nmtg such that the motor rotational speed Nm reaches a predetermined rotational speed that is different from the idle rotational speed Ni, and starts rotational speed control for the motor 4 such that the motor rotational speed Nm reaches the motor target rotational speed Nmtg to become higher than the idle rotational speed Ni by a rotational speed difference d1. The time immediately after time t12 is before the first clutch SSC starts slipping, and thus the engine rotational speed Ne is synchronized with the motor rotational speed Nm which has been subjected to the rotational speed control. In the embodiment, the engine 2 is set to the idle rotational speed Ni, and thus the motor rotational speed Nm is controlled so as to become higher than the idle rotational speed Ni by the rotational speed difference d1. In the case where the engine rotational speed Ne is set to a rotational speed other than the idle rotational speed Ni, however, the motor rotational speed Nm is set to a rotational speed that is different from the engine rotational speed.

With the motor 4 subjected to the rotational speed control as described above, the motor rotational speed Nm is controlled by the drive force of the motor 4 to a rotational speed (Ni+d1) that is higher than the idle rotational speed Ni by the rotational speed difference d1. Thus, it is no longer necessary to absorb the inertia of the engine 2, the inertia of the motor 4, the inertia of an input system of the speed change mechanism 5, or the like through drag control for the second clutch C1 of the speed change mechanism 5 or the like, for example. Accordingly, the time for control of the speed change mechanism 5 can be shortened, and a transition to the engagement control for the second clutch C1 can be made immediately. In addition, since it is not necessary to absorb the inertia described above with the second clutch C1, the amount of heat generated by the second clutch C1 is reduced, which improves the durability of the second clutch C1. In the meantime, as illustrated in FIG. 3, feedback torque Drab of the motor 4 is increased by an amount corresponding to the absorbed inertia.

After that, detection of a rotation difference of the first clutch SSC, which is detected on the basis of the detection of the engine rotational speed Ne by the engine rotational speed sensor 41 and the detection of the motor rotational speed Nm by the motor rotational speed sensor 42, is waited for (slip is waited for) (No in S1-3). When the rotation difference between the motor rotational speed Nm subjected to the rotational speed control as described above and the engine rotational speed Ne controlled to the idle rotational speed Ni, that is, the rotation difference of the first clutch SSC, reaches the rotational speed difference d1 at time t13 (Yes in S1-3), the first clutch SSC is in the slip engagement state, and thus the first clutch control means 22 first starts engine rotational speed control such that the engine rotational speed Ne is maintained at the idle rotational speed Ni through the drag state of the first clutch SSC (S1-4). That is, feedback control for the clutch SSC hydraulic pressure $P_{SSC}$ is started on the basis of the engine rotational speed Ne.

When the rotation difference of the first clutch SSC reaches the rotational speed difference d1 at time t13 (Yes in S1-3), in addition, the motor control means 23 sets the motor target rotational speed Nmtg to a steep gradient as a first predetermined gradient for a predetermined time such that a rotational speed for creep travel is reached. That is, the motor rotational speed Nm is rapidly lowered with the steep gradient, in consideration of the acceleration used when the hybrid vehicle 100 starts creep travel. After that, when the predetermined time elapses, the motor control means 23 sets a gentle gradient as a second predetermined gradient that is gentler than the first predetermined gradient, that is, starts the rotational speed control for the motor 4 such that the motor rotational speed Nm is gradually lowered with the gentle gradient (S1-5).

In the meantime, in addition, the second clutch control means 25 provides a command to maintain the clutch C1 hydraulic pressure $P_{C1}$ at a constant value such that the second clutch C1 achieves a torque capacity for transfer of the required drive force Treq on the basis of the required drive force Treq calculated by the required drive force calculation means 28 as discussed above.

After that, the speed change mechanism control means 24 calculates the speed ratio of the speed change mechanism 5 at all times from an input rotational speed Nin of the input shaft 5a detected by the input rotational speed sensor 43 of the speed change mechanism 5 and the output rotational speed Nout detected by the output rotational speed sensor 44. The motor control means 23 calculates a value obtained by multiplying the speed ratio calculated at the time by the output rotational speed Nout as a synchronization rotational speed Ns, and stands by until the difference between the synchronization rotational speed Ns and the motor rotational speed Nm detected by the motor rotational speed sensor 42 falls within a predetermined rotational speed difference d2 (No in S1-6).

Next, when the motor rotational speed Nm falls within the predetermined rotational speed difference d2 with respect to the synchronization rotational speed Ns at time t14 (Yes in S1-6), that is, the second clutch C1 of the speed change mechanism 5 is brought from the slip engagement state into the direct engagement state, it is determined that the motor 4 and the wheels 6 are synchronized with each other, the rotational speed control for the motor 4 is finished (S1-7), and a transition is made to the torque control in which the motor 4 is controlled such that the motor torque Tm reaches target torque.

When the motor rotational speed Nm falls within the predetermined rotational speed difference d2 with respect to the synchronization rotational speed Ns (Yes in S1-6), in addition, the second clutch control means 25 starts increasing the command value for the clutch C1 hydraulic pressure $P_{C1}$, performs engagement completion control for completing the direct engagement of the second clutch C1 (S1-8), and finishes the engagement completion control for the second clutch C1 at time t15.

The vehicle control device 1 computes the drive force limit value for protecting the speed change mechanism 5 on the basis of the torque capacity of the second clutch C1. Thus, the drive force limit value is increased on the basis of an increase in command value of the clutch C1 hydraulic pressure $P_{C1}$. In addition, the motor 4 transitions to the torque control, and input of the drive force (engine torque) of the engine 2 is increased as the slip engagement of the first clutch SSC progresses. Thus, the feedback torque Tmfb of the motor 4 is made smaller to become 0 by time t15.

The first clutch control means 22 performs feedback control for the clutch SSC hydraulic pressure $P_{SSC}$ while continuously performing the engine rotational speed control. Consequently, the drive force of the engine 2 is transferred to the wheels 6 via the speed change mechanism 5, in which the second clutch C1 is directly engaged to establish a shift speed, to increase the vehicle speed. That is, the motor rotational speed Nm on the output side with respect to the first clutch SSC (which is the same as the input rotational speed Nin of the speed change mechanism 5) is increased. Thus, at time t16, the engine rotational speed Ne and the motor rotational speed Nm are synchronized with each other, and also the first clutch SSC is brought into the direct engagement state. The starting control for the hybrid vehicle is thus finished (S1-9).

Next, a case where the accelerator is turned on (for example, with an accelerator operation amount of 100%) after the brake is turned off will be described with reference to FIG. 4.

As illustrated in FIG. 4, when the driver performs an N-D operation from the neutral range to the drive range (D range) at time t21 from a state in which power generation control is determined (power generation request is granted) with the brake turned on and the hybrid vehicle 100 stationary and releases the brake to turn off the brake at time t22, a starting request is determined (detected), and suspension of the power generation control is determined (power generation request is denied). Consequently, as in FIG. 3, the first clutch control means 22 starts controlling the first clutch SSC to the slip engagement state, and the second clutch control means 25 starts the engagement control for the second clutch C1 (S1-2).

Based on the detection of the starting request, the second clutch control means 25 first provides a command for fast fill of the clutch C1 hydraulic pressure $P_{C1}$ (play elimination up to the stroke end).

Here, when the accelerator is turned on by the driver at time t23, for example, the required drive force calculation means 28 calculates the required drive force Treq on the basis of the accelerator operation amount detected by the accelerator operation amount sensor 31. The drive force limit value Tlim for protecting the speed change mechanism 5 is lower than a required drive force Treq' (indicated by the broken line in FIG. 4) calculated in accordance with the accelerator operation amount. Accordingly, the required drive force Treq is calculated to be the same as the drive force limit value Tlim. Thus, when the fast fill is finished, the second clutch control means 25 provides a command for the clutch C1 hydraulic pressure $P_{C1}$ such that the second clutch C1 transfers the required drive force Treq calculated to be the same as the drive force limit value Tlim.

Meanwhile, the engine control means 21 provides a command to the engine 2 to control the engine rotational speed Ne to the idle rotational speed Ni on the basis of the detection of the starting request. The motor control means 23 sets the motor target rotational speed Nmtg such that the motor rotational speed Nm reaches a rotational speed that is higher than the idle rotational speed Ni by the rotational speed difference d1, and starts the rotational speed control for the motor 4 such that the motor rotational speed Nm reaches the motor target rotational speed Nmtg.

After that, when the rotation difference between the motor rotational speed Nm subjected to the rotational speed control as described above and the engine rotational speed Ne controlled to the idle rotational speed Ni reaches the rotational speed difference d1 at time t24 on the basis of the detection of the engine rotational speed Ne by the engine rotational speed sensor 41 and the detection of the motor rotational speed Nm by the motor rotational speed sensor 42 (Yes in S1-3), the first clutch SSC is in the slip engagement state, and thus the first clutch control means 22 first starts the engine rotational speed control such that the engine rotational speed Ne is maintained at the idle rotational speed Ni through the drag state of the first clutch SSC (S1-4). That is, the feedback control for the clutch SSC hydraulic pressure $P_{SSC}$ is started on the basis of the engine rotational speed Ne.

When the rotation difference of the first clutch SSC reaches the rotational speed difference d1 at time t24 (Yes in S1-3), in addition, the motor control means 23 sets the motor target rotational speed Nmtg to a set gradient that is larger than that for the creep travel discussed earlier, that is, starts the rotational speed control for the motor 4 such that the motor rotational speed Nm is lowered with the large set gradient matching the accelerator operation amount (S1-5), in consideration of the acceleration used when the hybrid vehicle 100 starts traveling with the required drive force Treq (which is the same as the drive force limit value Tlim) calculated as described above. In this case, the motor target rotational speed Nmtg is set to a constant set gradient. However, the motor target rotational speed Nmtg may also be set to a first predetermined gradient, which is a steep gradient, for a predetermined time, and thereafter to a second predetermined gradient, which is a gentle gradient, as in the case illustrated in FIG. 3.

In the meantime, in addition, the second clutch control means 25 provides a command to maintain the clutch C1 hydraulic pressure $P_{ct}$ at a constant value such that the second clutch C1 achieves a torque capacity for transfer of the required drive force Treq on the basis of the required drive force Treq calculated by the required drive force calculation means 28 as discussed above.

After that, the motor control means 23 calculates a value obtained by multiplying the speed ratio of the speed change mechanism 5, which is calculated at the time by the speed change mechanism control means 24, by the output rotational speed Nout as the synchronization rotational speed Ns, and stands by until the difference between the synchronization rotational speed Ns and the motor rotational speed Nm detected by the motor rotational speed sensor 42 falls within the predetermined rotational speed difference d2 (No in S1-6).

Next, when the motor rotational speed Nm falls within the predetermined rotational speed difference d2 with respect to the synchronization rotational speed Ns at time t25 (Yes in S1-6), that is, the second clutch C1 of the speed change mechanism 5 is brought from the slip engagement state into the direct engagement state, it is determined that the motor 4 and the wheels 6 are synchronized with each other, the rotational speed control for the motor 4 is finished (S1-7), and a transition is made to the torque control for the motor 4.

When the motor rotational speed Nm falls within the predetermined rotational speed difference d2 with respect to the synchronization rotational speed Ns (Yes in S1-6), in addition, the second clutch control means 25 starts increasing the command value for the clutch C1 hydraulic pressure $P_{C1}$, performs engagement completion control for completing the direct engagement of the second clutch C1 (S1-8), and finishes the engagement completion control for the second clutch C1 at time t26.

As in the case of FIG. 3, the drive force limit value for protecting the speed change mechanism 5 is computed on the basis of the torque capacity of the second clutch C1. Thus, the drive force limit value Tlim is also increased on the basis of an increase in command value for the clutch C1 hydraulic pressure $P_{C1}$, and the required drive force Treq is also accordingly increased. When the required drive force Treq reaches the required drive force Treq' (indicated by the broken line in FIG. 4) calculated in accordance with the accelerator operation amount, the required drive force Treq is calculated as the required drive force Treq', that is, a constant value. The motor 4 then transitions to the torque control, and input of the drive force (engine torque) of the engine 2 is increased as the slip engagement of the first clutch SSC progresses. Thus, the feedback torque Tmfb of the motor 4 is made smaller to become 0 in the course.

The first clutch control means 22 performs feedback control for the clutch SSC hydraulic pressure $P_{SSC}$ while continuously performing the engine rotational speed control. Consequently, the drive force of the engine 2 is transferred to the wheels 6 via the speed change mechanism 5, in which the second clutch C1 is directly engaged to establish a shift speed, to increase the vehicle speed. That is, the motor rotational speed Nm on the output side with respect to the first clutch SSC (which is the same as the input rotational speed Nin of the speed change mechanism 5) is increased. Thus, at time t27, the engine rotational speed Ne and the motor rotational speed Nm are synchronized with each other to also bring the first clutch SSC into the direct engagement state. The starting control for the hybrid vehicle is thus finished (S1-9).

According to the control device 1 for a hybrid vehicle, as described above, the second clutch C1 can be controlled from the disengaged state to the slip engagement state and the first clutch SSC can be controlled from the engaged state to the slip engagement state with the power generation control suspended and the motor rotational speed Nm of the motor 4 reduced when the hybrid vehicle 100 starts. Thus, it is possible to prevent imposition of a load on the second clutch C1, and to improve the durability of the second clutch C1. Moreover, the motor rotational speed Nm is reduced with the power generation control suspended. Thus, it is no longer necessary to adjust the motor rotational speed Nm through slip of the second clutch C1 of the speed change mechanism 5, which improves response for there being no need for revolving speed adjustment. Furthermore, since the second clutch C1 is controlled from the disengaged state to the slip engagement state and the first clutch SSC is controlled from the engaged state to the slip engagement state on the basis of the detection of the starting request, the vehicle can be started responsively, which lessens hesitation.

In the hybrid vehicle 100, in addition, power generation is performed by the alternator 50 when the vehicle starts. Thus, it is possible to suspend power generation by the motor 4, that is, to reduce the motor target rotational speed Nmtg.

Further, the motor rotational speed Nm can be reduced with the first predetermined gradient which is a steep gradient. Thus, it is possible to further reduce the load on the second clutch C1 to be brought into the slip engagement state. Moreover, if the motor rotational speed Nm is synchronized with the rotational speed of the second clutch C1 on the output side, for example, the engagement state of the second clutch C1 may not be detected. By reducing the motor rotational speed Nm with the second predetermined gradient which is a gentle gradient, however, it is possible to avoid imposition of a load on the second clutch C1, and to secure the controllability of the slip engagement state of the second clutch C1.

In addition, the motor control means 23 executes the rotational speed control such that the motor rotational speed Nm is lowered with the set gradient since the slip engagement of the first clutch SSC is determined until the motor rotational speed Nm falls within the predetermined rotational speed difference d2 with respect to the synchronization rotational speed Ns. Thus, synchronization in rotation can be achieved between the motor 4 and the wheels 6 responsively, which lessens hesitation and enables smooth starting.

In addition, the second clutch control means 25 performs the engagement control for the second clutch C1 such that the second clutch C1 achieves a torque capacity for transfer of the required drive force Treq during execution of the rotational speed control for the motor 4. Thus, even if a drive force that is equal to or more than the required drive force Treq required by the driver is output from the motor 4 which is subjected to the rotational speed control, the output drive force from the vehicle can be caused to match the required drive force Treq required by the driver until synchronization in rotational speed is achieved between the motor 4 and the wheels 6.

Further, the motor control means 23 executes the rotational speed control such that a predetermined rotational speed that is different from the engine rotational speed Ne is achieved (a rotational speed that is higher than the idle rotational speed Ni by the rotational speed difference d1 is achieved) until slip of the first clutch SSC is determined. Thus, slip of the first clutch SSC can be promoted by providing different rotational speeds to the input side and the output side of the first clutch SSC. Moreover, the rotational speeds of the engine 2 and the motor 4 are different from each other when the first clutch SSC slips, Thus, slip of the first clutch SSC can be detected easily.

In addition, the motor control means 23 can determine slip of the first clutch SSC by detecting a rotational speed difference between the motor rotational speed Nm detected by the motor rotational speed sensor 42 and the engine rotational speed Ne detected by the engine rotational speed sensor 41.

Further, the motor control means 23 finishes the rotational speed control and starts the torque control when the motor rotational speed Nm falls within the predetermined rotational speed difference d2 with respect to a rotational speed (that is, the synchronization rotational speed Ns) obtained by multiplying the speed ratio of the speed change mechanism 5 and the output rotational speed Nout. Thus, the motor 4 can be returned to the normal torque control when the second clutch C1 is brought into the direct engagement state, which enables the vehicle to accelerate without a discomfort.

The motor control means 23 executes the rotational speed control such that the motor target rotational speed Nmtg is reduced with a larger gradient as the accelerator operation amount before start of slip of the first clutch SSC is larger. Thus, the vehicle can be started responsively in accordance with a request for starting acceleration from the driver.

<Second Embodiment>

Figure 5:
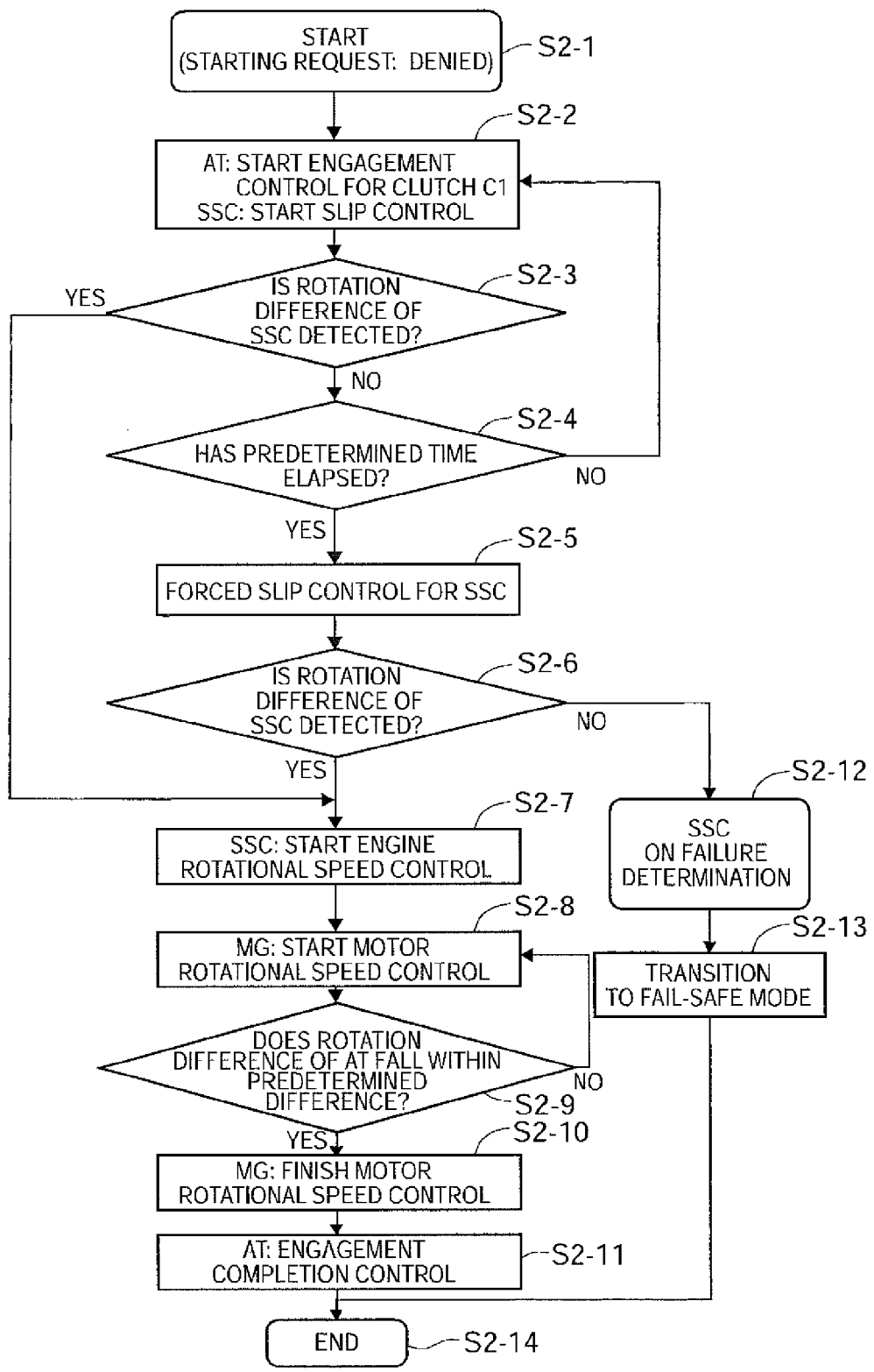
FIG. 5 is a flowchart illustrating control since suspension of power generation control until starting according to a second embodiment.

Next, a second embodiment obtained by partially modifying the first embodiment will be described with reference to FIGS. 5 to 7. Portions of the hybrid vehicle 100 and the control device 1 that are the same as those of the first embodiment will not be described. In the following description, in addition, a case where the motor rotational speed Nm is reduced for forced slip control will first be described with reference to FIGS. 5 and 6, and a case where the engine rotational speed Ne is increased for the forced slip control will next be described with reference to FIG. 7 mainly with focus on differences from FIG. 6.

In the second embodiment, as illustrated in FIG. 1, the vehicle control device 1 includes the forced slip means 26 for forcibly causing the first clutch SSC to slip, and the timer means 27 for counting the time elapsed from the detection of a starting request (suspension of power generation control).

Next, control performed when the vehicle starts in the second embodiment will be described. As illustrated in FIG. 6, when the driver performs an N-D operation from the neutral range to the drive range (D range) at time t31 from a state in which power generation control is determined (power generation request is granted) with the brake turned on and the hybrid vehicle 100 stationary and releases the brake to turn off the brake at time t32, a starting request is determined (detected), and suspension of the power generation control is determined (power generation request is denied). Consequently, the control is started (S2-1), and as in the first embodiment (see FIG. 3, for example), the first clutch control means 22 starts controlling the first clutch SSC to the slip engagement state, and the second clutch control means 25 starts the engagement control for the second clutch C1 (S2-2).

First, the second clutch control means 25 provides a command for fast fill of the clutch C1 hydraulic pressure $P_{C1}$ (play elimination up to the stroke end) on the basis of the detection of the starting request. Meanwhile, the required drive force calculation means 28 calculates a required drive force Treq as an amount corresponding to creep torque on the basis of the accelerator operation amount detected by the accelerator operation amount sensor 31 being off (0%). When the fast fill is finished, the second clutch control means 25 provides a command for the clutch C1 hydraulic pressure $P_{C1}$ such that the second clutch C1 transfers the required drive force Treq. Here, the required drive force Treq is smaller than the drive force limit value Tlim. Thus, the required drive force Treq is calculated as the amount corresponding to the creep torque with no particular limitation applied.

Meanwhile, the engine control means 21 provides a command to the engine 2 to control the engine rotational speed Ne to the idle rotational speed Ni on the basis of the detection of the starting request. The motor control means 23 sets the motor target rotational speed Nmtg such that the motor rotational speed Nm reaches a rotational speed that is higher than the idle rotational speed Ni by the rotational speed difference d1, and starts the rotational speed control for the motor 4 such that the motor rotational speed Nm reaches the motor target rotational speed Nmtg.

In the meantime, it is determined at all times whether or not there is caused a rotation difference between the engine rotational speed Ne and the motor rotational speed Nm, that is, a rotation difference of the first clutch SSC, on the basis of the detection of the engine rotational speed Ne by the engine rotational speed sensor 41 and the detection of the motor rotational speed Nm by the motor rotational speed sensor 42 (S2-3).

Meanwhile, at time t32, the timer means 27 starts counting the time from the detection of a starting request (suspension of power generation control). In the case where occurrence of a rotation difference of the first clutch SSC is not detected in step S2-3 (No in S2-3) as discussed above, it is determined whether or not a predetermined time (second predetermined time) TA has elapsed (S2-4). In the case where occurrence of a rotation difference of the first clutch SSC is detected before the predetermined time TA elapses, the process proceeds to step S2-7 to be discussed later, and control is performed as in the first embodiment to be finished.

For example, if the predetermined time TA elapses (Yes in S2-4) when occurrence of a rotation difference of the first clutch SSC is detected at time t33 (No in S2-3), the process proceeds to S2-5, and the forced slip means 26 executes forced slip control for forcibly reducing the motor rotational speed Nm to be less than the engine rotational speed Ne by causing the motor control means 23 to set the motor target rotational speed Nmtg to a rotational speed that is lower than the engine rotational speed Ne (here, the idle rotational speed Ni) by a rotational speed difference d3.

Consequently, the first clutch SSC is forcibly brought into the slip state, even if the friction engagement members are stuck to each other for some reason, for example, since the rotational speed difference d3 is caused between the input side and the output side of the first clutch SSC with the input side rotated by the drive force at the engine rotational speed Ne, which is the idle rotational speed Ni, and with the output side forcibly reduced to the motor rotational speed Nm through the rotational speed control for the motor 4.

In the case where a rotation difference of the first clutch SSC is not detected in step S2-6 (No in S2-6) even if the forced slip control for the first clutch SSC is executed by the forced slip means 26 as described above, the first clutch SSC is engaged (turned on) because of a valve failure of the hydraulic control device 5VB, for example (SSC on failure determination) (S2-12). Thus, the vehicle control device 1 transitions to a fail-safe mode (S2-13), and finishes the control (S2-14). In the fail-safe mode, control such as prohibition of starting of the vehicle, change to starting at the second forward speed or the third forward speed for protecting the speed change mechanism, and enhancement of torque limitation on the engine 2 or the motor 4 is conceivable.

In the case where a rotation difference of the first clutch SSC is detected at step S2-6 through execution of the forced slip control for the first clutch SSC, the process proceeds to step S2-7. As in the first embodiment, the first clutch control means 22 first starts the engine rotational speed control such that the engine rotational speed Ne is maintained at the idle rotational speed Ni through the drag state of the first clutch SSC (S2-7). That is, feedback control for the clutch SSC hydraulic pressure $P_{SSC}$ is started on the basis of the engine rotational speed Ne.

When a rotation difference of the first clutch SSC is detected at time t34 (Yes in S2-6), in addition, the motor control means 23 sets the motor target rotational speed Nmtg to the set gradient for the creep travel, that is, starts the rotational speed control for the motor 4 such that the motor rotational speed Nm is lowered with the set gradient matching the creep travel, in consideration of the acceleration used when the hybrid vehicle 100 starts traveling with the required drive force Treq for the creep torque calculated as described above (S2-8). In the case where the accelerator is turned on by the driver as in the case of FIG. 4 discussed above, the set gradient is set to a steep gradient in accordance with the accelerator operation amount. In this case as well, the motor target rotational speed Nmtg is set to a constant set gradient. However, the motor target rotational speed Nmtg may also be set to a first predetermined gradient, which is a steep gradient, for a predetermined time, and thereafter to a second predetermined gradient, which is a gentle gradient, as in the case illustrated in FIG. 3.

In the meantime, in addition, the second clutch control means 25 provides a command to maintain the clutch C1 hydraulic pressure $P_{C1}$ at a constant value such that the second clutch C1 achieves a torque capacity for transfer of the required drive force Treq on the basis of the required drive force Treq calculated by the required drive force calculation means 28 as discussed above.

After that, the motor control means 23 calculates a value obtained by multiplying the speed ratio of the speed change mechanism 5, which is calculated at the time by the speed change mechanism control means 24, by the output rotational speed Nout as the synchronization rotational speed Ns, and stands by until the difference between the synchronization rotational speed Ns and the motor rotational speed Nm detected by the motor rotational speed sensor 42 falls within the predetermined rotational speed difference d2 (No in S2-9).

When the motor rotational speed Nm falls within the predetermined rotational speed difference d2 with respect to the synchronization rotational speed Ns at time t35 (Yes in S2-9), that is, the second clutch C1 of the speed change mechanism 5 is brought from the slip engagement state into the direct engagement state, it is determined that the motor 4 and the wheels 6 are synchronized with each other, the rotational speed control for the motor 4 is finished (S2-10), and a transition is made to the torque control for the motor 4.

When the motor rotational speed Nm falls within the predetermined rotational speed difference d2 with respect to the synchronization rotational speed Ns (Yes in S2-9), in addition, the second clutch control means 25 starts increasing the command value for the clutch C1 hydraulic pressure $P_{C1}$, performs engagement completion control for completing the direct engagement of the second clutch C1 (S2-11), and finishes the engagement completion control for the second clutch C1 at time t36.

The first clutch control means 22 performs feedback control for the clutch SSC hydraulic pressure $P_{SSC}$ while continuously performing the engine rotational speed control. Consequently, the drive force of the engine 2 is transferred to the wheels 6 via the speed change mechanism 5, in which the second clutch C1 is directly engaged to establish a shift speed, to increase the vehicle speed. That is, the motor rotational speed Nm on the output side with respect to the first clutch SSC (which is the same as the input rotational speed Nin of the speed change mechanism 5) is increased. Thus, at time t37, the engine rotational speed Ne and the motor rotational speed Nm are synchronized with each other to also bring the first clutch SSC into the direct engagement state. The starting control for the hybrid vehicle is thus finished (S2-14).

Subsequently, a case where the forced slip control is performed by the engine 2 will be described with reference to FIG. 7. As illustrated in FIG. 7, when the driver performs an N-D operation at time t41 from a state in which power generation control is performed while the vehicle is stationary and the brake is released to be turned off at time t42, a starting request is determined (detected), and suspension of the power generation control is determined. As in the case of FIG. 6, the first clutch control means 22 starts controlling the first clutch SSC to the slip engagement state, and the second clutch control means 25 starts the engagement control for the second clutch C1 (S2-2).

Next, the second clutch control means 25 provides a command for fast fill of the clutch C1 hydraulic pressure $P_{C1}$ (play elimination up to the stroke end) on the basis of the detection of the starting request. Meanwhile, the required drive force calculation means 28 calculates a required drive force Treq as an amount corresponding to creep torque on the basis of the accelerator operation amount detected by the accelerator operation amount sensor 31 being off (0%). When the fast fill is finished, the second clutch control means 25 provides a command for the clutch C1 hydraulic pressure $P_{C1}$ such that the second clutch C1 transfers the required drive force Treq. Here, the required drive force Treq is smaller than the drive force limit value Tlim. Thus, the required drive force Treq is calculated as the amount corresponding to the creep torque with no particular limitation applied.

Meanwhile, the engine control means 21 provides a command to the engine 2 to control the engine rotational speed Ne to the idle rotational speed Ni on the basis of the detection of the starting request. The motor control means 23 sets the motor target rotational speed Nmtg such that the motor rotational speed Nm reaches a rotational speed that is higher than the idle rotational speed Ni by the rotational speed difference d1, and starts the rotational speed control for the motor 4 such that the motor rotational speed Nm reaches the motor target rotational speed Nmtg. The engine control means 21 starts lowering the engine torque Te at time t42 from a state in which torque is output to drive the motor 4 in charging control such that the idle rotational speed Ni is reached.

In the meantime, it is determined at all times whether or not there is caused a rotation difference between the engine rotational speed Ne and the motor rotational speed Nm, that is, a rotation difference of the first clutch SSC, on the basis of the detection of the engine rotational speed Ne by the engine rotational speed sensor 41 and the detection of the motor rotational speed Nm by the motor rotational speed sensor 42 (S2-3).

Meanwhile, at time t42, the timer means 27 starts counting the time from the detection of a starting request (suspension of power generation control). In the case where occurrence of a rotation difference of the first clutch SSC is not detected in step S2-3 (No in S2-3) as discussed above, it is determined whether or not a predetermined time (second predetermined time) TA has elapsed (S2-4). In the case where occurrence of a rotation difference of the first clutch SSC is detected before the predetermined time TA elapses, the process proceeds to step S2-7 to be discussed later, and the control discussed above is performed in the same manner to be finished.

For example, if the predetermined time TA elapses (Yes in S2-4) when occurrence of a rotation difference of the first clutch SSC is not detected at time t43 (No in S2-3), the process proceeds to step S2-5, and the forced slip means 26 executes forced slip control for forcibly increasing the engine rotational speed Ne so as to bring the engine rotational speed Ne to a rotational speed that is higher than the idle rotational speed Ni by a rotational speed difference d4 by causing the engine control means 21 to control the engine torque Te so as to temporarily increase the engine torque Te.

Consequently, the first clutch SSC is forcibly brought into the slip state, even if the friction engagement members are stuck to each other for some reason, for example, since the rotational speed difference d4 is caused between the input side and the output side of the first clutch SSC with the input side rotated by the drive force at the engine rotational speed Ne, which is higher than the idle rotational speed Ni by a rotational speed difference d1+d4, and with the output side maintained at the motor rotational speed Nm, which is higher than the idle rotational speed by the rotational speed difference d1 through the rotational speed control for the motor 4.

Similarly, in the case where a rotation difference of the first clutch SSC is not detected in step S2-6 (No in S2-6) even if the forced slip control for the first clutch SSC is executed by the forced slip means 26 as described above, an SSC on failure determination is performed (S2-12), a transition is made to a fail-safe mode (S2-13), and the control is finished (S2-14).

In the case where a rotation difference of the first clutch SSC is detected at step S2-6 through execution of the forced slip control for the first clutch SSC, the process proceeds to step S2-7. After that, similarly, the engine rotational speed control for the first clutch SSC is started such that the engine rotational speed Ne is maintained at the idle rotational speed Ni (S2-7), the motor target rotational speed Nmtg is set to the set gradient for the creep travel, and the rotational speed control for the motor 4 is started such that the motor rotational speed is lowered with the set gradient (S2-8).

In the meantime, in addition, the second clutch control means 25 provides a command to maintain the clutch C1 hydraulic pressure $P_{C1}$ at a constant value such that the second clutch C1 achieves a torque capacity for transfer of the required drive force Treq on the basis of the required drive force Treq calculated by the required drive force calculation means 28 as discussed above.

After that, the motor control means 23 calculates a value obtained by multiplying the speed ratio of the speed change mechanism 5, which is calculated at the time by the speed change mechanism control means 24, by the output rotational speed Nout as the synchronization rotational speed Ns, and stands by until the difference between the synchronization rotational speed Ns and the motor rotational speed Nm detected by the motor rotational speed sensor 42 falls within the predetermined rotational speed difference d2 (No in S2-9).

When the motor rotational speed Nm falls within the predetermined rotational speed difference d2 with respect to the synchronization rotational speed Ns at time t45 (Yes in S2-9), that is, the second clutch C1 of the speed change mechanism 5 is brought from the slip engagement state into the direct engagement state, it is determined that the motor 4 and the wheels 6 are synchronized with each other, the rotational speed control for the motor 4 is finished (S2-10), and a transition is made to the torque control for the motor 4.

When the motor rotational speed Nm falls within the predetermined rotational speed difference d2 with respect to the synchronization rotational speed Ns (Yes in S2-9), in addition, the second clutch control means 25 starts increasing the command value for the clutch C1 hydraulic pressure $P_{C1}$, performs engagement completion control for completing the direct engagement of the second clutch C1 (S2-11), and finishes the engagement completion control for the second clutch C1 at time t46.

The first clutch control means 22 performs feedback control for the clutch SSC hydraulic pressure $P_{SSC}$ while continuously performing the engine rotational speed control. Consequently, the drive force of the engine 2 is transferred to the wheels 6 via the speed change mechanism 5, in which the second clutch C1 is directly engaged to establish a shift speed, to increase the vehicle speed. That is, the motor rotational speed Nm on the output side with respect to the first clutch SSC (which is the same as the input rotational speed Nin of the speed change mechanism 5) is increased.

Thus, at time t47, the engine rotational speed Ne and the motor rotational speed Nm are synchronized with each other to also bring the first clutch SSC into the direct engagement state. The starting control for the hybrid vehicle is thus finished (S2-14).

With the control device 1 for a hybrid vehicle according to the second embodiment, as described above, the forced slip means 26 executes the forced slip control in which the first clutch SSC is forcibly caused to slip in the case where there is not detected a revolving speed difference between the motor rotational speed Nm detected by the motor rotational speed sensor 42 and the engine rotational speed Ne detected by the engine rotational speed sensor 41 even if the time counted by the timer means 27 reaches the predetermined time TA. Thus, it is possible to increase certainty of transition to slip of the first clutch SSC after the power generation control is suspended.

Figure 6:
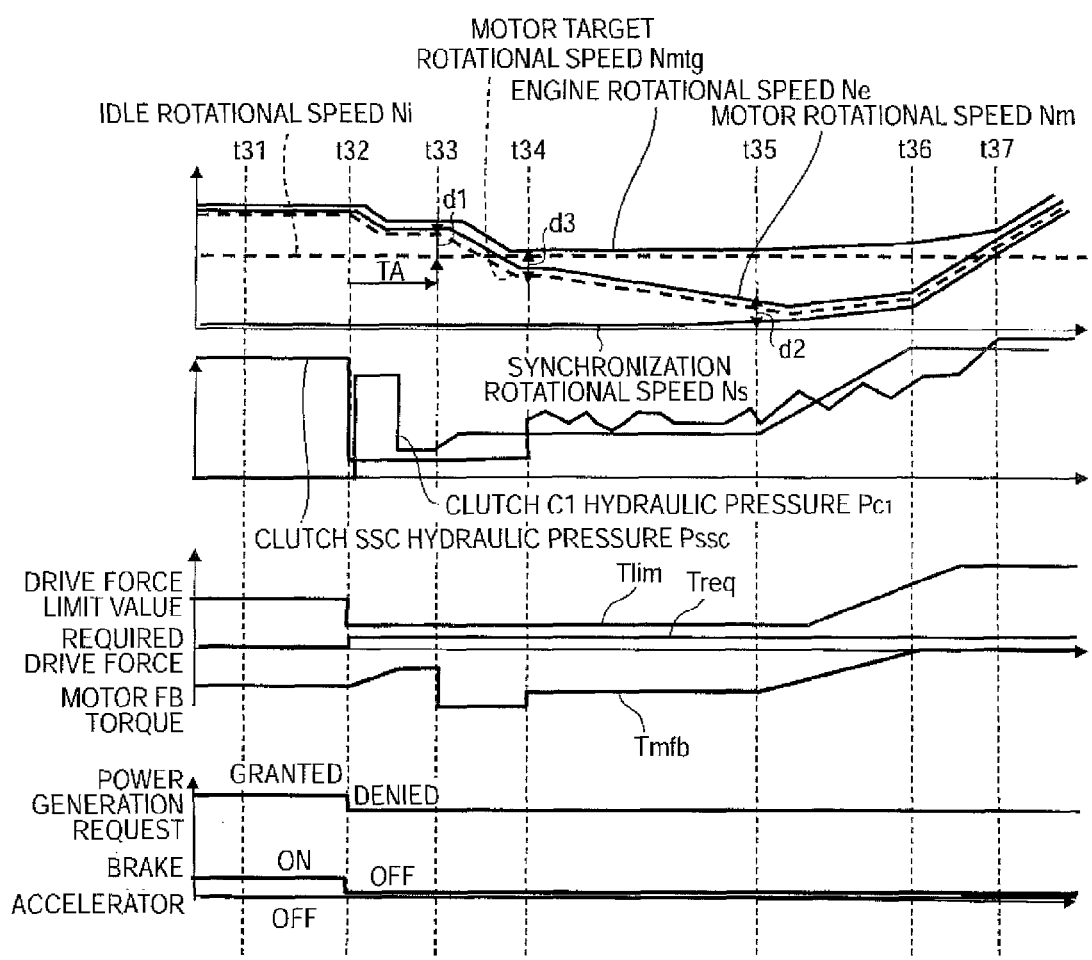
FIG. 6 is a time chart illustrating starting with forced slip control performed by a motor according to the second embodiment.

In addition, the forced slip means 26 can execute the forced slip control by providing a command to the motor control means 23 to control the motor rotational speed Nm to a rotational speed that is lower than the engine rotational speed Ne as illustrated in FIG. 6.

Figure 7:
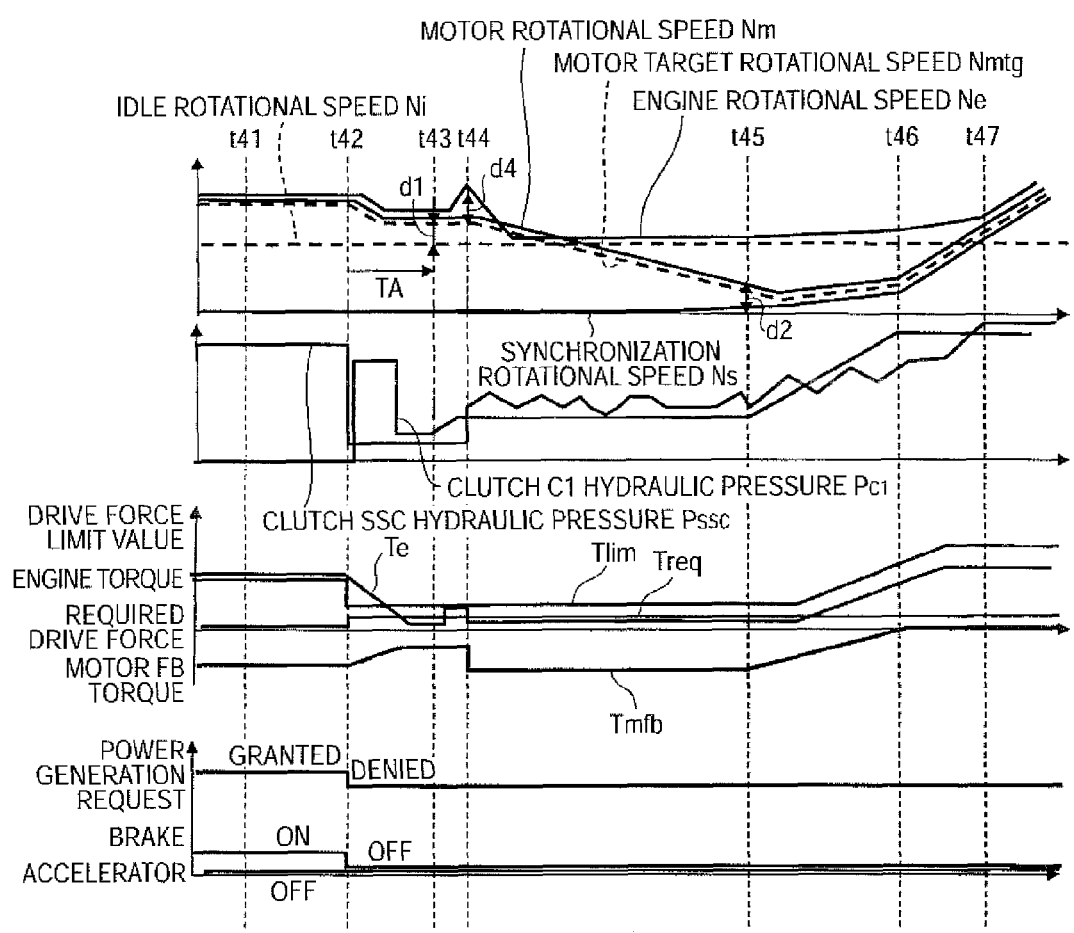
FIG. 7 is a time chart illustrating starting with forced slip control performed by an engine according to the second embodiment.

Further, the forced slip means 26 can execute the forced slip control by providing a command to the engine control means 21 to control the engine rotational speed Ne to a rotational speed that is higher than the motor rotational speed Nm as illustrated in FIG. 7.

In the forced slip control, a reduction in motor rotational speed illustrated in FIG. 6 and an increase in engine rotational speed illustrated in FIG. 7 can be combined with each other. In the case where the accelerator is turned on after a starting request is detected on the basis of the brake being turned off, in particular, the engine torque Te may be directly increased. Thus, it is conceivable that the reduction in motor rotational speed Nm illustrated in FIG. 6 is naturally combined with the increase in engine rotational speed Ne illustrated in FIG. 7.

Other components, functions, and effects of the second embodiment are the same as those of the first embodiment, and thus are not described.

<Third Embodiment>

Next, a third embodiment obtained by partially modifying the first embodiment will be described with reference to FIGS. 8 and 9. Portions of the hybrid vehicle 100 and the control device 1 that are the same as those of the first embodiment will not be described.

Figure 8:
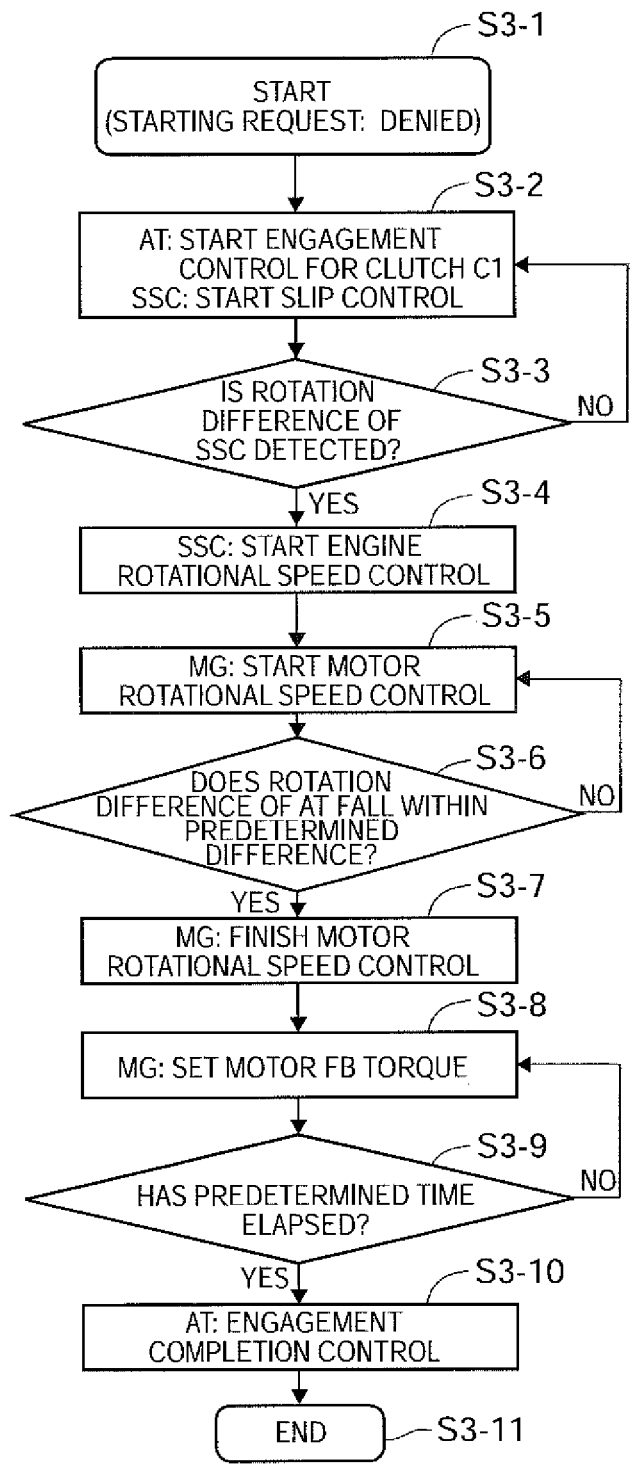
FIG. 8 is a flowchart illustrating control since suspension of power generation control until starting according to a third embodiment.
Figure 9:
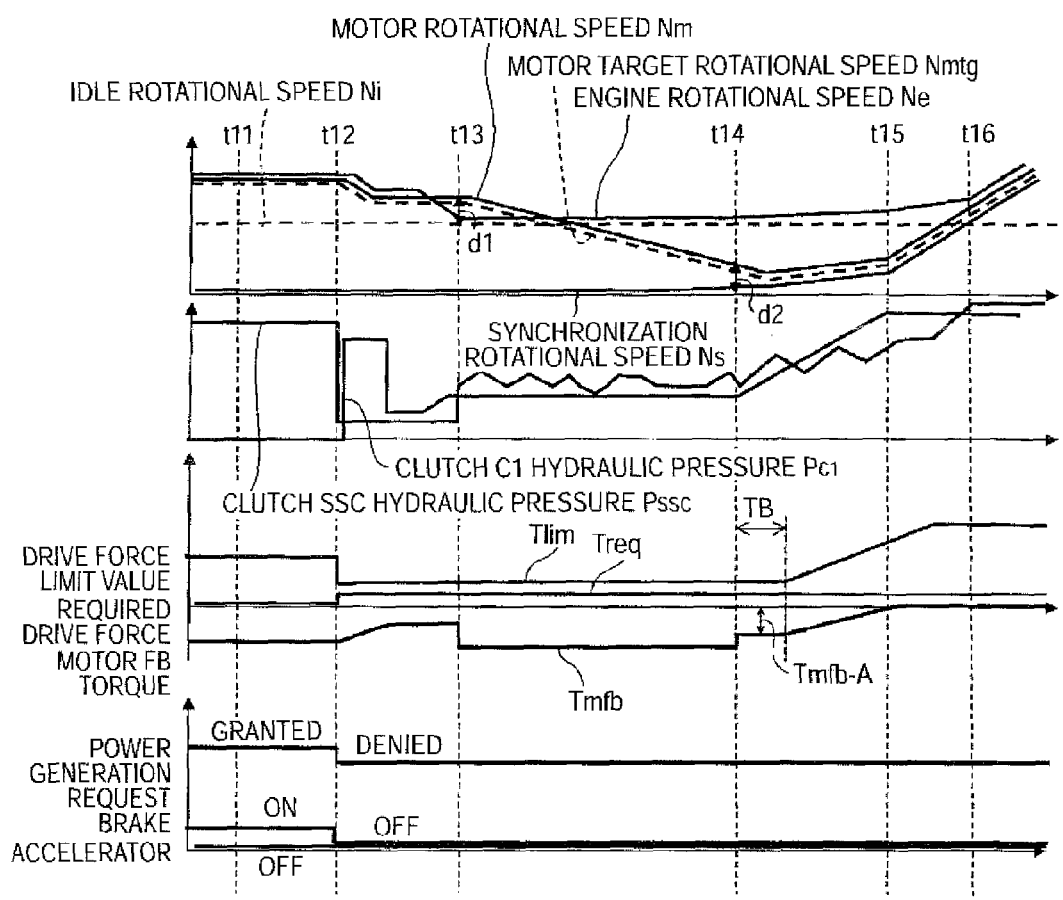
FIG. 9 is a time chart illustrating starting with the accelerator operation amount turned off according to the third embodiment.

When the third embodiment is compared with the first embodiment, step S3-8 and step S3-9 are added as illustrated in FIG. 8, and slip that occurs when torque that is larger than the torque capacity of the second clutch C1 is transferred to the second clutch C1 is prevented for a predetermined time (first predetermined time) TB (that is, until the torque capacity of the second clutch C1 is sufficiently increased) from time t14 when a transition is made from the rotational speed control for the motor 4 to the torque control as illustrated in FIG. 9. Step S3-1 to step S3-7 illustrated in FIG. 8 correspond to step S1-1 to step S1-7, respectively, illustrated in FIG. 2. Step S3-10 and step S3-11 illustrated in FIG. 8 correspond to step S1-8 and S1-9, respectively, illustrated in FIG. 2.

More particularly, as illustrated in FIG. 9, in a state in which the vehicle control device 1 determines power generation control (power generation request is granted) on the basis of an insufficient remaining capacity of a battery (not illustrated) in order to charge the battery during a vehicle stationary state in which the driver depresses the brake to turn on the brake, for example, and the hybrid vehicle 100 is stationary in a neutral range (N range), for example, the clutch SSC hydraulic pressure $P_{SSC}$ as a complete engagement command is supplied from the hydraulic control device 5VB to the first clutch SSC on the basis of a command from the first clutch control means 22, and the first clutch SSC is brought into the direct engagement state, which drivably couples the engine 2 and the motor 4 to each other. In the state, no supply (0 pressure) of the clutch C1 hydraulic pressure $P_{C1}$ from the hydraulic control device 5VB to the second clutch C1 is commanded on the basis of a command from the second clutch control means 25, and the second clutch C1 is brought into the disengaged state, which disables power transfer between the engine 2 and the motor 4 and the wheels 6. The engine 2 is controlled to a rotational speed for power generation on the basis of a command from the engine control means 21. That is, the motor 4 is driven by the engine 2 to generate power for the battery.

When the driver performs an N-D operation from the neutral range to a drive range (D range) from this state at time t11 and releases the brake to turn off the brake at time t12, for example, the vehicle control device 1 determines (detects) that the driver is requesting starting (starting request), and the vehicle control device 1 determines suspension of the power generation control (power generation request is denied). As illustrated in FIG. 8, starting control is started (S3-1) after the power generation control is suspended (power generation request is denied). First, as illustrated in FIG. 9, the first clutch control means 22 lowers the clutch SSC hydraulic pressure $P_{SSC}$ to a predetermined pressure such that the first clutch SSC is brought into the slip engagement state, and the second clutch control means 25 starts engagement control for the second clutch C1 (S3-2). The predetermined pressure for the clutch SSC hydraulic pressure $P_{SSC}$ is a command value that causes the first clutch SSC to be disengaged when a long time elapses. In consideration of the hydraulic response, however, the first clutch SSC is in the slip engagement state, and not completely disengaged.

First, the second clutch control means 25 provides a command for fast fill of the clutch C1 hydraulic pressure $P_{C1}$ (play elimination up to the stroke end) on the basis of the detection of the starting request (on the basis of the suspension of the power generation control). Meanwhile, the required drive force calculation means 28 calculates a required drive force Treq as an amount corresponding to creep torque on the basis of the accelerator operation amount detected by the accelerator operation amount sensor 31 being off (0%). When the fast fill is finished, the second clutch control means 25 provides a command for the clutch C1 hydraulic pressure $P_{C1}$ such that the second clutch C1 transfers the required drive force Treq. In order to protect the speed change mechanism 5, the speed change mechanism control means 24 sets a drive force limit value Tlim, and provides a command for the clutch C1 hydraulic pressure $P_{C1}$ such that the second clutch C1 transfers the drive force limit value Tlim if the required drive force Treq exceeds the drive force limit value Tlim.

Meanwhile, the engine control means 21 provides a command to the engine 2 to control the engine rotational speed Ne to an idle rotational speed Ni on the basis of the detection of the starting request (on the basis of the suspension of the power generation control). The motor control means 23 sets the motor target rotational speed Nmtg such that the motor rotational speed Nm reaches a predetermined rotational speed that is different from the idle rotational speed Ni, and starts rotational speed control for the motor 4 such that the motor rotational speed Nm reaches the motor target rotational speed Nmtg to become higher than the idle rotational speed Ni by a rotational speed difference d1. The time immediately after time t12 is before the first clutch SSC starts slipping, and thus the engine rotational speed Ne is synchronized with the motor rotational speed Nm which has been subjected to the rotational speed control. In the embodiment, the engine 2 is set to the idle rotational speed Ni, and thus the motor rotational speed Nm is controlled so as to become higher than the idle rotational speed Ni by the rotational speed difference d1. In the case where the engine rotational speed Ne is set to a rotational speed other than the idle rotational speed Ni, however, the motor rotational speed Nm is set to a rotational speed that is different from the engine rotational speed.

With the motor 4 subjected to the rotational speed control as described above, the motor rotational speed Nm is controlled by the drive force of the motor 4 to a rotational speed (Ni+d1) that is higher than the idle rotational speed Ni by the rotational speed difference d1 Thus, it is no longer necessary to absorb the inertia of the engine 2, the inertia of the motor 4, the inertia of an input system of the speed change mechanism 5, or the like through drag control for the second clutch C1 of the speed change mechanism 5 or the like, for example. Accordingly, the time for control of the speed change mechanism 5 can be shortened, and a transition to the engagement control for the second clutch C1 can be made immediately. In addition, since it is not necessary to absorb the inertia described above with the second clutch C1, the amount of heat generated by the second clutch C1 is reduced, which improves the durability of the second clutch C1. In the meantime, as illustrated in FIG. 9, feedback torque Tmfb of the motor 4 is increased by an amount corresponding to the absorbed inertia.

After that, detection of a rotation difference of the first clutch SSC, which is detected on the basis of the detection of the engine rotational speed Ne by the engine rotational speed sensor 41 and the detection of the motor rotational speed Nm by the motor rotational speed sensor 42, is waited for (slip is waited for) (No in S3-3). When the rotation difference between the motor rotational speed Nm subjected to the rotational speed control as described above and the engine rotational speed Ne controlled to the idle rotational speed Ni, that is, the rotation difference of the first clutch SSC, reaches the rotational speed difference d1 at time t13 (Yes in S3-3), the first clutch SSC is in the slip engagement state, and thus the first clutch control means 22 first starts engine rotational speed control such that the engine rotational speed Ne is maintained at the idle rotational speed Ni through the drag state of the first clutch SSC (S3-4). That is, feedback control for the clutch SSC hydraulic pressure $P_{SSC}$ is started on the basis of the engine rotational speed Ne.

When the rotation difference of the first clutch SSC reaches the rotational speed difference d1 at time t13 (Yes in S3-3), in addition, the motor control means 23 sets the motor target rotational speed Nmtg to the set gradient for the creep travel, that is, starts the rotational speed control for the motor 4 such that the motor rotational speed Nm is gradually lowered with the set gradient, in consideration of the acceleration used when the hybrid vehicle 100 starts the creep travel (S3-5).

In the meantime, in addition, the second clutch control means 25 provides a command to maintain the clutch C1 hydraulic pressure $P_{C1}$ at a constant value such that the second clutch C1 achieves a torque capacity for transfer of the required drive force Treq on the basis of the required drive force Treq calculated by the required drive force calculation means 28 as discussed above.

After that, the speed change mechanism control means 24 calculates the speed ratio of the speed change mechanism 5 at all times from an input rotational speed Nin of the input shaft 5a detected by the input rotational speed sensor 43 of the speed change mechanism 5 and the output rotational speed Nout detected by the output rotational speed sensor 44. The motor control means 23 calculates a value obtained by multiplying the speed ratio calculated at the time by the output rotational speed Nout as a synchronization rotational speed Ns, and stands by until the difference between the synchronization rotational speed Ns and the motor rotational speed Nm detected by the motor rotational speed sensor 42 falls within a predetermined rotational speed difference d2 (No in S3-6).

During a period from time t13 to time t14, the motor 4 is subjected to rotational speed control. The feedback torque Tmfb of the motor 4 output during the period has a value obtained by adding torque (hereinafter referred to as "rotation variation torque") that causes variations in rotation (an amount corresponding to the inertia) of the motor 4 (including a portion of the speed change mechanism 5 on the input side with respect to the second clutch C1) to torque (hereinafter referred to as "matching torque") for matching the torque capacity of the first clutch SSC and the torque capacity of the second clutch C1 with each other.

Here, the "matching torque" for matching the torque capacity of the first clutch SSC and the torque capacity of the second clutch C1 with each other has a value obtained by subtracting the torque capacity of the second clutch C1 from the torque capacity of the first clutch SSC, because torque obtained by subtracting torque of the motor 4 from the engine torque transferred from the first clutch SSC (the first clutch SSC transfers torque corresponding to an amount by which the engine rotational speed Ne is not increased) will be transferred to the second clutch C1, which will not cause the second clutch C1 to slip. For the feedback torque Tmfb of the motor 4, the feedback torque Tmfb (matching torque+ rotation variation torque) discussed above is naturally output by lowering the rotational speed of the motor 4 with the set gradient through the rotational speed control, rather than computing the values of the matching torque and the rotation variation torque.

Next, when the motor rotational speed Nm falls within the predetermined rotational speed difference d2 with respect to the synchronization rotational speed Ns at time t14 (Yes in S3-6), that is, the second clutch C1 of the speed change mechanism 5 is brought from the slip engagement state into the direct engagement state, it is determined that the motor 4 and the wheels 6 are synchronized with each other, the rotational speed control for the motor 4 is finished (S3-7), and a transition is made to the torque control in which the motor 4 is controlled such that the motor torque Tm reaches target torque.

Here, in the third embodiment, a value obtained by subtracting the rotation variation torque (torque required to vary the revolving speed of the rotary electric machine) from the feedback torque Tmfb of the motor 4 at the time when the rotational speed control is finished (output torque of the rotary electric machine at the time when the revolving speed control is finished) is set as target torque for the motor 4, that is, the feedback torque Tmfb is set to the matching torque Tmfb-A (S3-8). The second clutch control means 25 starts increasing the command value for the clutch C1 hydraulic pressure $P_{C1}$ from time t14.

Consequently, torque obtained by subtracting the matching torque Tmfb-A, which is obtained from the feedback torque Tmfb of the motor 4, from the engine torque transferred from the first clutch SSC is transferred to the second clutch C1. Thus, input of torque that exceeds the torque capacity of the second clutch C1 to the second clutch C1 is prevented, that is, slip of the second clutch C1 is prevented.

After the feedback torque Tmfb is set to the matching torque Tmfb-A, a lapse of the predetermined time TB is waited for (No in S3-9). The predetermined time TB is set to the time until the actual hydraulic pressure for the second clutch C1 is increased and the torque capacity of the second clutch C1 becomes larger than the engine torque transferred from the first clutch SSC. Thus, if the feedback torque Tmfb is set to the matching torque Tmfb-A until the predetermined time TB elapses, the gear second clutch C1 does not slip even if the engine torque transferred from the first clutch SSC is thereafter input to the second clutch C1.

After that, when the predetermined time TB elapses after the motor rotational speed control is finished (Yes in S3-9), the second clutch control means 25 performs engagement completion control for completing direct engagement of the second clutch C1 (S3-10), and finishes the engagement completion control for the second clutch C1 at time t15.

The vehicle control device 1 computes the drive force limit value for protecting the speed change mechanism 5 on the basis of the torque capacity of the second clutch C1. Thus, the drive force limit value is increased on the basis of an increase in command value for the clutch C1 hydraulic pressure $P_{C1}$. In addition, the feedback torque Tmfb of the motor 4 is gradually reduced to become 0 by time t15.

The first clutch control means 22 performs feedback control for the clutch SSC hydraulic pressure $P_{SSC}$ while continuously performing the engine rotational speed control. Consequently, the drive force of the engine 2 is transferred to the wheels 6 via the speed change mechanism 5, in which the second clutch C1 is directly engaged to establish a shift speed, to increase the vehicle speed. That is, the motor rotational speed Nm on the output side with respect to the first clutch SSC (which is the same as the input rotational speed Nin of the speed change mechanism 5) is increased. Thus, at time t16, the engine rotational speed Ne and the motor rotational speed Nm are synchronized with each other, and also the first clutch SSC is brought into the direct engagement state. The starting control for the hybrid vehicle is thus finished (S3-11).

According to the control device 1 for a hybrid vehicle, as described above, torque output from the motor 4 during the rotational speed control for the motor 4 has a value obtained by adding torque (an amount corresponding to the inertia torque) required to vary the rotational speed (revolving speed) of the motor 4 to a value obtained by subtracting the torque capacity transferred through the second clutch C1 from the torque capacity transferred through the first clutch SSC. Thus, by setting target torque for the feedback torque Tmfb to a value obtained by subtracting torque (an amount corresponding to the inertia torque) required to vary the rotational speed of the motor 4 from the feedback torque Tmfb of the motor 4 at the time when the rotational speed control is finished for the predetermined time TB since the torque control is started, the motor control means 23 can set the target feedback torque Tmfb-A for the motor 4 to a value obtained by subtracting the torque capacity transferred through the second clutch C1 from the torque capacity transferred through the first clutch SSC (that is, the engine torque) for the predetermined time TB since the torque control is started. That is, torque obtained by subtracting the target feedback torque Tmfb-A for the motor 4 from the torque capacity transferred through the first clutch SSC (that is, the engine torque) is transferred to the second clutch C1 which has just started being engaged, so that the second clutch C1 will not slip. When the predetermined time TB elapses, engagement of the second clutch C1 (an increase in actual hydraulic pressure) progresses, and the torque capacity of the second clutch C1 becomes sufficiently large. Thus, the second clutch C1 will not slip thereafter.

Other components, functions, and effects of the third embodiment are the same as those of the first embodiment, and thus are not described.

In the third embodiment, the forced slip control described in relation to the second embodiment is not performed. As a matter of course, however, the forced slip control that is the same as that in the second embodiment may also be performed in the third embodiment.

In the first to third embodiments described above, when a starting request is detected and power generation control is suspended, the first clutch SSC is brought into the slip engagement state. However, slip engagement of the first clutch SSC may be started concurrently while slip engagement of the second clutch C1 is performed after the first clutch SSC is temporarily completely disengaged.

In the first to third embodiments described above, synchronization in rotation between the motor 4 and the wheels 6 is determined when the motor rotational speed Nm falls within a predetermined revolving speed difference with respect to the synchronization rotational speed Ns which is obtained by multiplying the speed ratio of the speed change mechanism and the output rotational speed Nout. However, a configuration in which synchronization in rotation between the motor 4 and the wheels 6 is determined when a value obtained by dividing the motor rotational speed Nm by the speed ratio falls within a predetermined revolving speed difference from the output rotational speed Nout is synonymous with the above configuration, and falls within the scope of preferred embodiments.

In the first to third embodiments described above, the second clutch of the speed change mechanism 5 is the clutch C1 which cooperates with a one-way clutch to establish the first speed. However, the present embodiment is not limited thereto, and the second clutch may be any clutch that can disable, enable with slip, and enable the power transfer state of the speed change mechanism 5 through friction engagement.

INDUSTRIAL APPLICABILITY

The control device for a hybrid vehicle according to preferred embodiments can be used for vehicles such as passenger cars and trucks, and is particularly suitable for use in vehicles for which it is desired to secure the durability of a clutch in addition to improving response when the vehicle starts from a state in which power generation control by a rotary electric machine is executed while the vehicle is stationary.

DESCRIPTION OF THE REFERENCE NUMERALS

1 CONTROL DEVICE FOR HYBRID VEHICLE
2 ENGINE
4 ROTARY ELECTRIC MACHINE (MOTOR)
5 SPEED CHANGE MECHANISM
6 WHEEL
21 ENGINE CONTROL MEANS
22 FIRST CLUTCH CONTROL MEANS
23 ROTARY ELECTRIC MACHINE CONTROL MEANS (MOTOR CONTROL MEANS)
25 SECOND CLUTCH CONTROL MEANS
26 FORCED SLIP MEANS
27 TIMER MEANS
28 REQUIRED DRIVE FORCE CALCULATION MEANS
31 ACCELERATOR OPERATION AMOUNT SENSOR
41 ENGINE REVOLVING SPEED SENSOR (ENGINE ROTATIONAL SPEED SENSOR)
42 ROTARY ELECTRIC MACHINE REVOLVING SPEED SENSOR (MOTOR ROTATIONAL SPEED SENSOR)
44 OUTPUT ROTATIONAL SPEED SENSOR
50 ALTERNATOR
100 HYBRID VEHICLE
C1 SECOND CLUTCH
Ne REVOLVING SPEED OF ENGINE (ENGINE ROTATIONAL SPEED)
Nm REVOLVING SPEED OF ROTARY ELECTRIC MACHINE (MOTOR ROTATIONAL SPEED)
Nmtg TARGET REVOLVING SPEED (MOTOR TARGET ROTATIONAL SPEED)
Nout OUTPUT REVOLVING SPEED
Ns REVOLVING SPEED OBTAINED BY MULTIPLYING SPEED RATIO OF SPEED CHANGE MECHANISM AND OUTPUT REVOLVING SPEED (SYNCHRONIZATION ROTATIONAL SPEED)
SSC FIRST CLUTCH
TA SECOND PREDETERMINED TIME
TB FIRST PREDETERMINED TIME
Treq REQUIRED DRIVE FORCE
d1 REVOLVING SPEED DIFFERENCE
d2 PREDETERMINED REVOLVING SPEED DIFFERENCE

The invention claimed is:

1. A control device configured to be used in a hybrid vehicle in which a first clutch, a rotary electric machine, and a second clutch are disposed on a power transfer path from an engine to wheels sequentially from the engine side,
the control device being configured to start the hybrid vehicle on the basis of detection of a starting request, the control device configured to perform:
first clutch control by controlling an engagement state of the first clutch on the basis of detection of the starting request;
second clutch control by controlling an engagement state of the second clutch on the basis of detection of the starting request; and
rotary electric machine control by performing revolving speed control of the rotary electric machine such that a revolving speed of the rotary electric machine reaches a target revolving speed on the basis of detection of the starting request, wherein
after power generation control in which the engine is driven with the first clutch directly engaged and with the second clutch disengaged is suspended on the basis of detection of the starting request from a state in which the vehicle is stationary with the power generation control performed, the control device performs second clutch control by controlling the second clutch from a disengaged state to a slip engagement state, and first clutch control by controlling the first clutch from an engaged state to a slip engagement state, and rotary electric machine control by reducing the target revolving speed.

2. The control device for a hybrid vehicle according to claim 1, wherein:
  the hybrid vehicle has an alternator configured to generate power through rotation of the engine to supply electric power to an accessory; and
  the control device performs rotary electric machine control by reducing the target revolving speed while the alternator is generating power with the engine driven on the basis of detection of the starting request.

3. The control device for a hybrid vehicle according to claim 2, wherein
  when reducing the target revolving speed, the control device performs rotary electric machine control by reducing the target revolving speed with a first predetermined gradient, and thereafter reduces the target revolving speed with a second predetermined gradient that is gentler than the first predetermined gradient.

4. The control device for a hybrid vehicle according to claim 3, wherein
  the control device performs second clutch control by causing the second clutch to transition to a direct engagement state when the revolving speed of the rotary electric machine falls within a predetermined revolving speed difference with respect to a revolving speed obtained by multiplying a speed ratio of the speed change mechanism and an output revolving speed.

5. The control device for a hybrid vehicle according to claim 2, wherein
  the control device performs second clutch control by causing the second clutch to transition to a direct engagement state when the revolving speed of the rotary electric machine falls within a predetermined revolving speed difference with respect to a revolving speed obtained by multiplying a speed ratio of the speed change mechanism and an output revolving speed.

6. The control device for a hybrid vehicle according to claim 1, wherein
  when reducing the target revolving speed, the control device performs rotary electric machine control by reducing the target revolving speed with a first predetermined gradient, and thereafter reduces the target revolving speed with a second predetermined gradient that is gentler than the first predetermined gradient.

7. The control device for a hybrid vehicle according to claim 6, wherein
  the control device performs second clutch control by causing the second clutch to transition to a direct engagement state when the revolving speed of the rotary electric machine falls within a predetermined revolving speed difference with respect to a revolving speed obtained by multiplying a speed ratio of the speed change mechanism and an output revolving speed.

8. The control device for a hybrid vehicle according to claim 1, wherein
  the control device performs second clutch control by causing the second clutch to transition to a direct engagement state when the revolving speed of the rotary electric machine falls within a predetermined revolving speed difference with respect to a revolving speed obtained by multiplying a speed ratio of the speed change mechanism and an output revolving speed.

9. The control device for a hybrid vehicle according to claim 1, wherein the control device is further configured to perform:
  required drive force calculation by calculating a required drive force required by a driver, wherein
  the second clutch control is performed by controlling the second clutch such that the second clutch generates a torque capacity for transfer of the required drive force during execution of the revolving speed control for the rotary electric machine.

10. The control device for a hybrid vehicle according to claim 1, wherein
  the control device performs rotary electric machine control by executing the revolving speed control so that a predetermined revolving speed that is different from the revolving speed of the engine is achieved until the slip engagement state of the first clutch is determined.

11. The control device for a hybrid vehicle according to claim 1, wherein
  the control device performs rotary electric machine control by determining the slip engagement state of the first clutch on the basis of a revolving speed difference between the revolving speed of the rotary electric machine, which is detected by a rotary electric machine revolving speed sensor, and the revolving speed of the engine, which is detected by an engine revolving speed sensor.

12. The control device for a hybrid vehicle according to claim 1, wherein
  the control device performs rotary electric machine control by finishing the revolving speed control and starting torque control in which the rotary electric machine is controlled such that output torque of the rotary electric machine reaches target torque when the revolving speed of the rotary electric machine falls within a predetermined revolving speed difference with respect to a revolving speed obtained by multiplying the speed ratio of the speed change mechanism and the output revolving speed.

13. The control device for a hybrid vehicle according to claim 12, wherein
  the control device performs rotary electric machine control by setting the target torque to a value obtained by subtracting torque required to vary the revolving speed of the rotary electric machine from the output torque of the rotary electric machine at a time when the revolving speed control is finished for a first predetermined time since the torque control is started.

14. The control device for a hybrid vehicle according to claim 1, wherein the control device is further configured to perform:
  as a timer by counting a time elapsed since the power generation control is suspended; and
  forced slip control by executing forced slip control in which the first clutch is forcibly caused to slip in the case where a revolving speed difference between the revolving speed of the rotary electric machine, which is detected by a rotary electric machine revolving speed sensor, and the revolving speed of the engine, which is detected by an engine revolving speed sensor, is not detected even when the time counted by the timer reaches a second predetermined time.

15. The control device for a hybrid vehicle according to claim 14, wherein
  the forced slip control is executed by forcing slip control by providing a command to the rotary electric machine control to control the revolving speed of the rotary electric machine to a revolving speed that is lower than the revolving speed of the engine.

16. The control device for a hybrid vehicle according to claim 15, wherein the control device is further configured to perform:
engine control by controlling the revolving speed of the engine, wherein
the forced slip control is executed by forcing slip control by providing a command to the engine control to control the revolving speed of the engine to a revolving speed that is higher than the revolving speed of the rotary electric machine.

17. The control device for a hybrid vehicle according to claim 14, wherein the control device is further configured to perform:
engine control by controlling the revolving speed of the engine, wherein
the forced slip control is executed by forcing slip control by providing a command to the engine control to control the revolving speed of the engine to a revolving speed that is higher than the revolving speed of the rotary electric machine.

18. The control device for a hybrid vehicle according to claim 1, wherein
the control device performs rotary electric machine by executing the revolving speed control such that the target revolving speed is reduced with a larger gradient as an accelerator operation amount before start of slip of the first clutch is larger.

* * * * *